United States Patent
Miyoshi

(10) Patent No.: US 11,186,141 B2
(45) Date of Patent: Nov. 30, 2021

(54) VEHICLE-MOUNTED TEMPERATURE CONTROLLER

(71) Applicant: TOYOTA JIDOSHA KABUSHIKI KAISHA, Toyota (JP)

(72) Inventor: Yuji Miyoshi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/853,172

(22) Filed: Apr. 20, 2020

(65) Prior Publication Data

US 2020/0353790 A1    Nov. 12, 2020

(30) Foreign Application Priority Data

May 10, 2019    (JP) .............................. JP2019-090015

(51) Int. Cl.
*B60H 1/00*    (2006.01)
*B60H 1/32*    (2006.01)

(52) U.S. Cl.
CPC ....... *B60H 1/00885* (2013.01); *B60H 1/0065* (2013.01); *B60H 1/3205* (2013.01); *B60H 2001/00928* (2013.01); *B60H 2001/00957* (2013.01)

(58) Field of Classification Search
CPC .............. B60H 1/00885; B60H 1/0028; B60H 1/00957; B60H 1/0065; B60H 1/3205; B60H 2001/00928; B60H 2001/00957; B60H 1/00278
See application file for complete search history.

(56) References Cited

U.S. PATENT DOCUMENTS

| | | |
|---|---|---|
| 2011/0072841 A1 | 3/2011 | Arai et al. |
| 2015/0217622 A1 | 8/2015 | Enomoto et al. |
| 2016/0318370 A1 | 11/2016 | Rawlinson |
| 2017/0021698 A1 | 1/2017 | Hatakeyama et al. |
| 2019/0145675 A1* | 5/2019 | Kim .................... B60H 1/32284 62/324.6 |
| 2019/0176563 A1* | 6/2019 | Kim .................... B60H 1/00885 |

(Continued)

FOREIGN PATENT DOCUMENTS

| | | |
|---|---|---|
| JP | 2011-73536 A | 4/2011 |
| JP | 2014-43181 A | 3/2014 |

(Continued)

*Primary Examiner* — Marc E Norman
(74) *Attorney, Agent, or Firm* — Sughrue Mion, PLLC

(57) ABSTRACT

A vehicle-mounted temperature controller used in a vehicle having a motor, a battery, and a PCU is provided with a low temperature circuit and a refrigeration circuit. The low temperature circuit has a battery heat exchanger, a PCU heat exchanger, a radiator, and a chiller, and the cooling water circulates through them. The refrigeration circuit has a condenser and the chiller absorbing heat from the cooling water to the refrigerant, and the refrigerant circulates through them. The low temperature circuit is configured to be able to switch connection states between a first state where the battery heat exchanger and the chiller are connected, the PCU heat exchanger and the radiator are connected, and the battery heat exchanger and the chiller are not connected to the PCU heat exchanger and the radiator, and a second state where the chiller, the PCU heat exchanger, and the radiator are connected.

11 Claims, 14 Drawing Sheets

(56) References Cited

U.S. PATENT DOCUMENTS

| | | | |
|---|---|---|---|
| 2019/0176572 A1* | 6/2019 | Kim | B60H 1/00428 |
| 2020/0290426 A1* | 9/2020 | Aikawa | B60H 1/00278 |
| 2020/0317026 A1* | 10/2020 | Kitamura | B60H 1/00778 |

FOREIGN PATENT DOCUMENTS

| | | |
|---|---|---|
| JP | 2015-186989 A | 10/2015 |
| JP | 2019-43262 A | 3/2019 |

* cited by examiner

VEHICLE-MOUNTED TEMPERATURE CONTROLLER

FIELD

The present disclosure relates to a vehicle-mounted temperature controller.

BACKGROUND

In the past, a vehicle-mounted temperature controller provided with a refrigeration circuit and a low temperature circuit has been proposed (for example, PTL 1). The refrigeration circuit is configured so as to realize a refrigeration cycle by circulation of a refrigerant. The low temperature circuit has a heat generating equipment heat exchanger exchanging heat with heat generating equipment, such as a power control unit (PCU) or battery, and a low temperature radiator. In such a vehicle-mounted temperature controller, the refrigeration circuit and the low temperature circuit share a single chiller. This chiller transfers heat from the cooling water of the low temperature circuit to the refrigerant to make the refrigerant of the refrigeration circuit evaporate.

Further, in the vehicle-mounted temperature controller according to PTL 1, a condensing part radiating heat to the outside to make the refrigerant condense is provided at the refrigeration circuit. This radiated heat is used for heating a passenger compartment of a vehicle mounting the vehicle-mounted temperature controller.

CITATIONS LIST

Patent Literature

[PTL 1] Japanese Unexamined Patent Publication No. 2015-186989

SUMMARY

Technical Problem

In this regard, in a vehicle-mounted temperature controller of the above-mentioned configuration, the low temperature circuit preferably has the following functions.

The first function is the function of enabling the heat medium to circulate through the radiator and chiller in a single flow state of the low temperature circuit. Due to this function, during heating the vehicle compartment, the heat absorbed from the outside air at the radiator of the low temperature circuit is used for heating. Further, the second function is the function of enabling the heat medium to circulate through the PCU heat exchanger and radiator in a single flow state of the low temperature circuit. Due to this function, it is possible to absorb heat from the PCU and discharge that heat at the radiator of the low temperature circuit.

In addition, the third function is the function of enabling the heat medium to constantly circulate through the PCU heat exchanger, in the low temperature circuit. The PCU sometimes temporarily becomes greater in amount of heat generation due to, for example, rapid acceleration, but even in such a case, the element of the PCU is kept from exceeding the heat resistance temperature by constantly circulating heat medium to the PCU heat exchanger. Furthermore, the fourth function is the function of enabling the heat medium to circulate through the battery heat exchanger and radiator in a single flow state of the low temperature circuit. Due to this function, it is possible to absorb heat from the battery heat exchanger and discharge that heat at the radiator of the low temperature circuit.

Further, the fifth function is the function of enabling heat medium cooled by the chiller to circulate through the battery in a single flow state of the low temperature circuit. Due to this function, when the battery is a high temperature, the battery can be rapidly cooled.

However, in the vehicle-mounted temperature controller described in PTL 1, only some functions of these five functions are satisfied. The functions of the low temperature circuit were not sufficient.

In consideration of the above problem, an object of the present disclosure is to provide a vehicle-mounted temperature controller provided with a low temperature circuit configured so as to have the necessary functions.

Solution to Problem

The present invention has as its gist the following.

(1) A vehicle-mounted temperature controller used in a vehicle, the vehicle having a motor for driving a vehicle, a battery supplying electric power to the motor, and a power control unit controlling electric power supplied to the motor, comprising:
a first heat circuit having a battery heat exchanger exchanging heat with the battery, a PCU heat exchanger exchanging heat with the power control unit, a radiator, and a first heat exchanger, and configured so that the first heat medium circulates through them; and
a refrigeration circuit having a second heat exchanger discharging heat from a refrigerant to something other than the refrigerant and the first heat medium to make the refrigerant condense, and the first heat exchanger absorbing heat from the first heat medium to the refrigerant to make the refrigerant evaporate, and configured to realize a refrigeration cycle by the refrigerant being circulated through them, wherein
the first heat circuit is configured to be able to switch connection states between a first state where the battery heat exchanger and the first heat exchanger are connected so that the first heat medium flows through them, the PCU heat exchanger and the radiator are connected so that the first heat medium flows through them and the battery heat exchanger and the first heat exchanger are not connected to the PCU heat exchanger and the radiator in a state where the first heat medium flows through them, and a second state where the first heat exchanger, the PCU heat exchanger, and the radiator are connected so that the first heat medium flows through them.

(2) The vehicle-mounted temperature controller according to above (1), further comprising a motor heat exchanger exchanging heat with the motor, wherein
in the first state, the motor heat exchanger is connected to the PCU heat exchanger and the radiator so that the first heat medium flows through them, and the battery heat exchanger and the first heat exchanger are not connected to the PCU heat exchanger, the radiator, and the motor heat exchanger in a state where the first heat medium flows through them.

(3) The vehicle-mounted temperature controller according to above (2), wherein the first heat circuit is configured to be able to switch connection states between a state where, in the second state, the motor heat exchanger is connected to the first heat exchanger, the PCU heat exchanger, and the radiator so that the first heat medium flows through it and a state where the motor heat exchanger is not connected to the first heat exchanger, the PCU heat exchanger, and the radiator so that the first heat medium flows through it.

(4) The vehicle-mounted temperature controller according to above (3), wherein the first heat circuit is configured so that in the second state and in a state where the motor heat exchanger is connected to the first heat exchanger, the PCU heat exchanger, and the radiator so that the first heat medium flows through them, the first heat medium circulates through the radiator, the PCU heat exchanger, and the motor heat exchanger in that order.

(5) The vehicle-mounted temperature controller according to any one of above (2) to (4), wherein the first heat circuit is configured so that, in the first state, the first heat medium circulates through the radiator, the PCU heat exchanger, and the motor heat exchanger in that order.

(6) The vehicle-mounted temperature controller according to any one of above (1) to (5), wherein the first heat circuit is configured so as to be able to switch connection states, in the second state, between a state where the battery heat exchanger is connected to the first heat exchanger, the PCU heat exchanger, and the radiator so that the first heat medium flows through them, and a state where the battery heat exchanger is not connected to the first heat exchanger, the PCU heat exchanger, and the radiator so that the first heat medium flows through them.

(7) The vehicle-mounted temperature controller according to any one of above (1) to (6), wherein when a temperature of the battery is higher than the reference battery temperature, a connection state of the first heat circuit is set to the second state and a state where the battery heat exchanger is not connected to the first heat exchanger, the PCU heat exchanger, and the radiator so that the first heat medium flows through them.

(8) The vehicle-mounted temperature controller according to above (7), wherein when a temperature of the battery is higher than an upper limit battery temperature, which is higher than the reference battery temperature, the connection state of the first heat circuit is set to the first state.

(9) The vehicle-mounted temperature controller according to above (7) or (8), wherein when a temperature of the battery is equal to or less than the reference battery temperature and heating inside the compartment of the vehicle is not demanded, the connection state of the first heat circuit is set to the first state.

(10) The vehicle-mounted temperature controller according to any one of above (7) to (9), wherein when a temperature of the battery is equal to or less than the reference battery temperature and heating inside the compartment of the vehicle is demanded and the temperature of the first heat medium is lower than a predetermined lower limit heat medium temperature, the connection state of the first heat circuit is set to the first state.

(11) The vehicle-mounted temperature controller according to above (10), wherein when a temperature of the battery is equal to or less than the reference battery temperature and heating inside the compartment of the vehicle is demanded and the temperature of the first heat medium is equal to or greater than the lower limit heat medium temperature, the connection state of the first heat circuit is set to the second state where the battery heat exchanger is not connected to the first heat exchanger, the PCU heat exchanger, and the radiator.

(12) The vehicle-mounted temperature controller according to any one of above (1) to (11), further comprising a second heat circuit having a heater core performing heating of the inside of a vehicle compartment and configured so that the second heat medium circulates through the heater core, wherein the second heat exchanger exchanges heat between the refrigerant and the second heat medium so as to make heat move from the refrigerant to the second heat medium.

Advantageous Effects of Invention

According to the present disclosure, a vehicle-mounted temperature controller provided with a low temperature circuit configured so as to have the necessary functions is provided.

DESCRIPTION OF EMBODIMENTS

Figure 1:
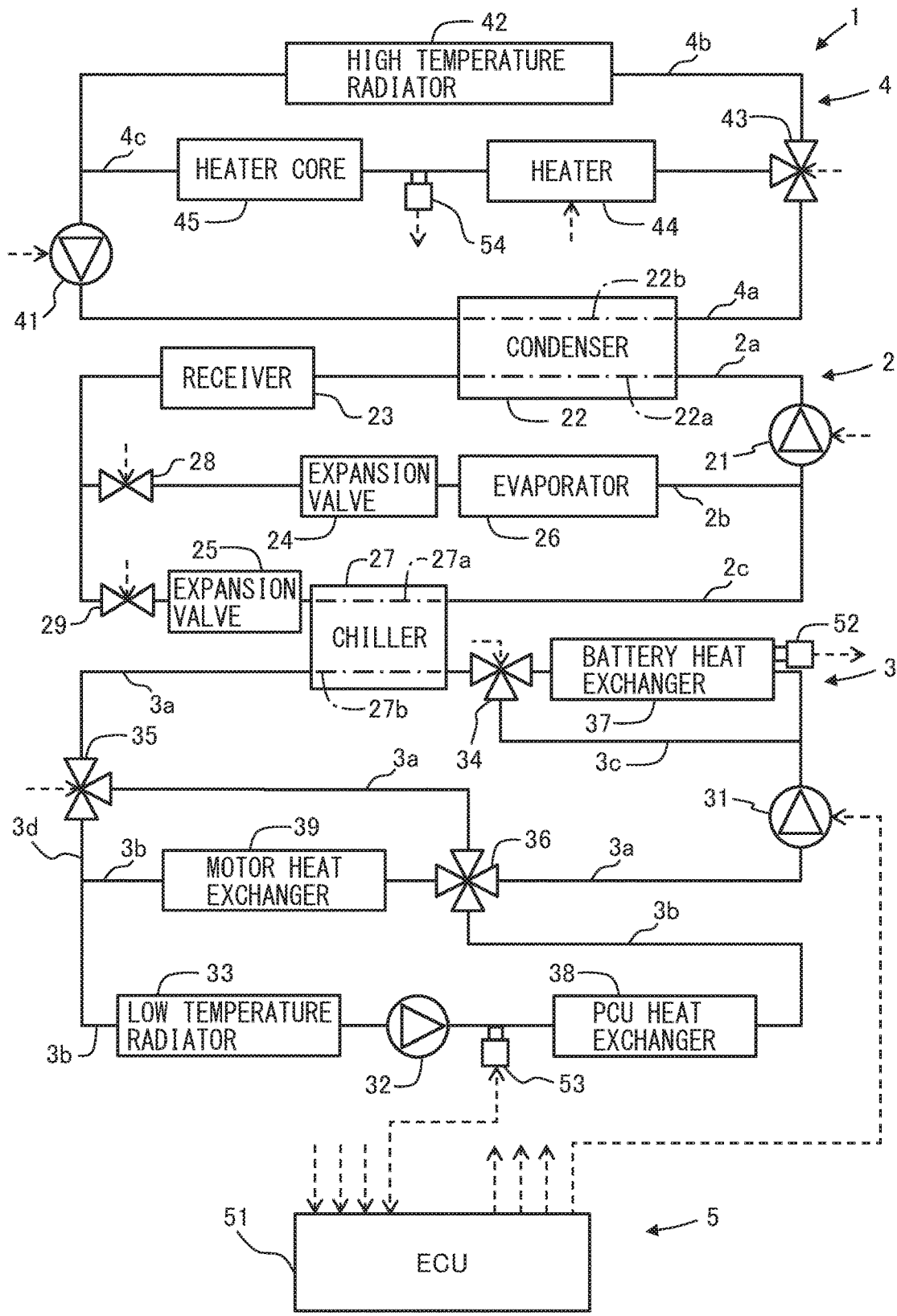
FIG. 1 is a view of the constitution schematically showing a vehicle-mounted temperature controller.

Below, referring to the drawings, embodiments will be explained in detail. Note that, in the following explanation, similar components are assigned the same reference signs.

Configuration of Vehicle-Mounted Temperature Controller

Figure 2:
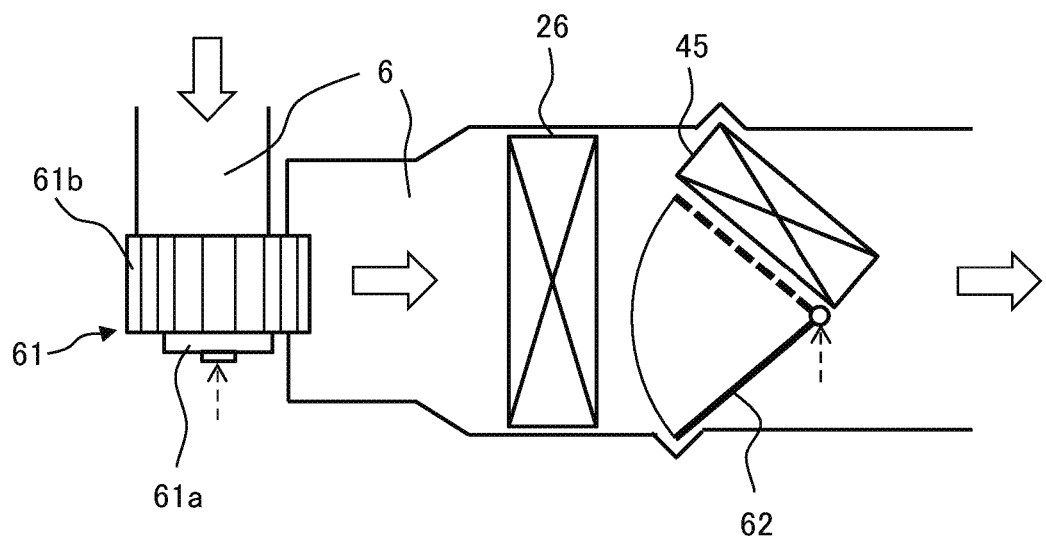
FIG. 2 is a view of the configuration schematically showing an air passage for air-conditioning of a vehicle mounting the vehicle-mounted temperature controller.
Figure 3:
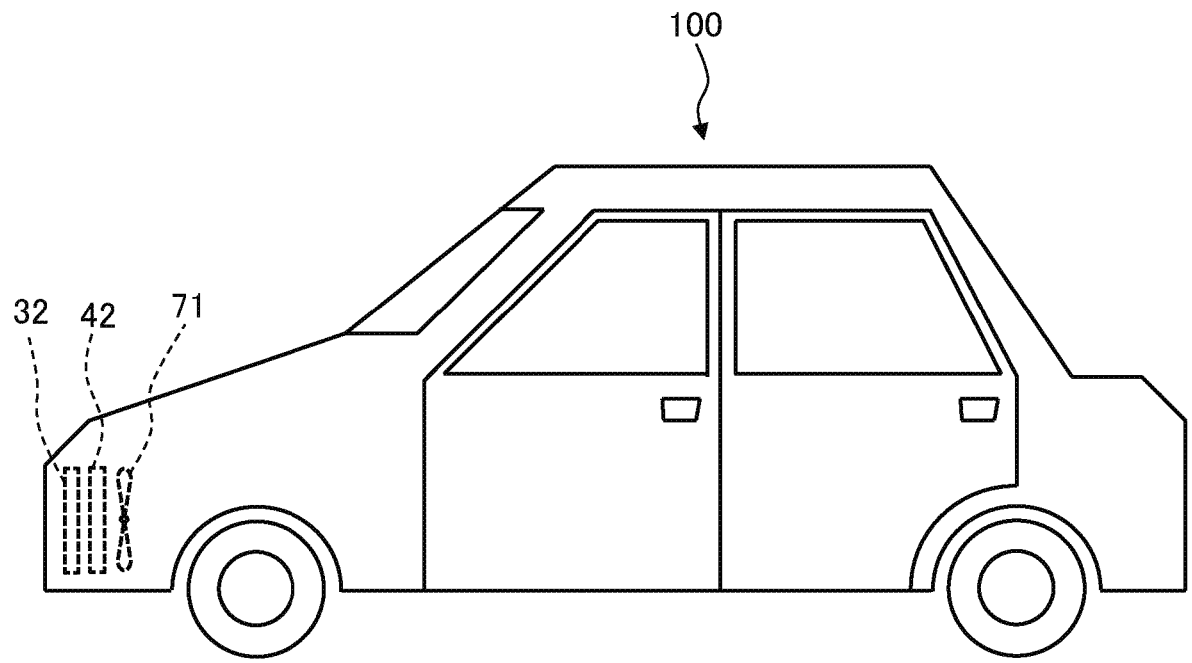
FIG. 3 is a view schematically showing the vehicle mounting the vehicle-mounted temperature controller.

Referring to FIGS. 1 to 3, the configuration of a vehicle-mounted temperature controller 1 according to one embodiment will be explained. FIG. 1 is a view of the configuration schematically showing the vehicle-mounted temperature controller 1. In the present embodiment, the vehicle-mounted temperature controller 1 is particularly mounted in an electric vehicle driven by a motor.

The vehicle-mounted temperature controller 1 includes a refrigeration circuit 2, low temperature circuit (first heat circuit) 3, high temperature circuit (second heat circuit) 4, and control device 5.

First, the refrigeration circuit 2 will be explained. The refrigeration circuit 2 includes a compressor 21, refrigerant piping 22a of a condenser 22, receiver 23, first expansion valve 24, second expansion valve 25, evaporator 26, refrigerant piping 27a of the chiller 27, first regulating valve 28, and second regulating valve 29. The refrigeration circuit 2 is configured to realize a refrigeration cycle by circulation of a refrigerant through these components. For the refrigerant, for example, a hydrofluorocarbon (for example, HFC-134a) or any other substance generally used as a refrigerant in the refrigeration cycle is used.

The refrigeration circuit 2 is divided into a refrigerant basic flow path 2a, evaporator flow path 2b, and chiller flow path 2c. The evaporator flow path 2b and the chiller flow path 2c are provided parallel to each other and are respectively connected to the refrigerant basic flow path 2a.

At the refrigerant basic flow path 2a, the compressor 21, the refrigerant piping 22a of the condenser 22, and the receiver 23 are provided in that order in a direction of circulation of the refrigerant. At the evaporator flow path 2b, the first regulating valve 28, the first expansion valve 24, and the refrigerant piping 27a of the evaporator 26 are provided in that order in a direction of circulation of the refrigerant. In addition, at the chiller flow path 2c, the second regulating valve 29, the second expansion valve 25, and the chiller 27 are provided in that order.

At the refrigerant basic flow path 2a, the refrigerant flows regardless of the opening/closing of the first regulating valve 28 and the second regulating valve 29. If the refrigerant flows to the refrigerant basic flow path 2a, the refrigerant flows through the compressor 21, the refrigerant piping 22a of the condenser 22, and the receiver 23 in that order. At the evaporator flow path 2b, the refrigerant flows when the first regulating valve 28 is opened. If the refrigerant flows to the evaporator flow path 2b, the refrigerant flows through the first regulating valve 28, the first expansion valve 24, and the refrigerant piping 27a of the evaporator 26 in that order. The refrigerant flows to the chiller flow path 2c when the second regulating valve 29 is opened. If the refrigerant flows to the chiller flow path 2c, the refrigerant flows through the second regulating valve 29, the second expansion valve 25, and the chiller 27 in that orders.

The compressor 21 functions as a compressor compressing the refrigerant to raise it in temperature. In the present embodiment, the compressor 21 is an electrically driven type, and is configured so that the discharge capacity can be changed steplessly by adjustment of the electric power supplied to the compressor 21. In the compressor 21, the mainly gaseous refrigerant with low temperature and low pressure flowing out from the evaporator 26 or the chiller 27 is adiabatically compressed, whereby it is changed to a mainly gaseous refrigerant with high temperature and high pressure.

The condenser 22 is provided with the refrigerant piping 22a and cooling water piping 22b. The condenser 22 functions as a second heat exchanger for discharging heat from the refrigerant to something other than the refrigerant and cooling water of the later explained low temperature circuit 3 to cause the refrigerant to condense. In the present embodiment, the condenser 22 exchanges heat between the refrigerant flowing through the refrigerant piping 22a and the cooling water flowing through the later explained cooling water piping 22b and transfers the heat from the refrigerant to this cooling water. The refrigerant piping 22a of the condenser 22 functions as a condenser condensing the refrigerant in the refrigeration cycle. Further, in the refrigerant piping 22a of the condenser 22, the mainly gaseous refrigerant with high temperature and high pressure, flowing out from the compressor 21, is changed to mainly liquid refrigerant with high temperature and high pressure by being isobarically cooled.

The receiver 23 stores the refrigerant condensed by the refrigerant piping 22a of the condenser 22. Further, in the condenser 22, not necessarily all of the refrigerant can be liquefied, therefore the receiver 23 is configured to separate the gas and liquid. Only liquid refrigerant, from which the gaseous refrigerant is separated, flows out from the receiver 23. Note that, instead of the receiver 23, the refrigeration circuit 2 may also use a sub cool type condenser housing a gas-liquid separator as the condenser 22.

The first expansion valve 24 and the second expansion valve 25 function as expanders making the refrigerant expand. These expansion valves 24 and 25 are provided with small diameter passages, and spray refrigerant from the small diameter passages to make the pressure of the refrigerant rapidly decrease. The first expansion valve 24 sprays a mist of liquid refrigerant supplied from the receiver 23 into the evaporator 26. Similarly, the second expansion valve 25 sprays a mist of liquid refrigerant supplied from the receiver 23 into the refrigerant piping 27a of the chiller 27. At these expansion valves 24 and 25, the liquid refrigerant with high temperature and high pressure, flowing out from the receiver 23, is depressurized and partially vaporizes, whereby it is changed to a mist-like refrigerant with low temperature and low pressure. Note that, the expansion valves may be mechanical type expansion valves with fixed superheating degrees or may be electrical type expansion valves able to adjust the superheating degrees. Further, if possible to make the refrigerant expand to reduce the pressure, for example, ejectors or other devices may be used as the expanders, instead of the first expansion valve 24 and the second expansion valve 25.

The evaporator 26 functions as an evaporator causing the refrigerant to evaporate. Specifically, the evaporator 26 makes the refrigerant absorb heat from the air surrounding the evaporator 26 to make the refrigerant evaporate. Therefore, in the evaporator 26, the mist-like refrigerant with low temperature and low pressure, flowing out from the first expansion valve 24 is changed to a gaseous refrigerant with low temperature and low pressure, by evaporation. As a result, the air surrounding the evaporator 26 can be cooled and the passenger compartment can be cooled.

The chiller 27 is provided with the refrigerant piping 27a and the cooling water piping 27b. The chiller 27 functions as the first heat exchanger making the refrigerant absorb heat from the cooling water of the later explained low temperature circuit 3 to evaporate the refrigerant. In the present embodiment, the chiller 27 exchanges heat between the cooling water flowing through the later explained cooling water piping 27b and the refrigerant flowing through the refrigerant piping 27a, and transfers heat from this cooling water to the refrigerant. The refrigerant piping 27a of the chiller 27 functions as an evaporator for making the refrigerant evaporate. Further, at the refrigerant piping 27a of the chiller 27, the mist-like refrigerant with low temperature and low pressure, flowing out from the second expansion valve 25, evaporates, whereby it is changed to a gaseous refrigerant with low temperature and low pressure. As a result, the cooling water of the low temperature circuit 3 is cooled.

The first regulating valve 28 and the second regulating valve 29 are used for changing the circulation mode of refrigerant in the refrigeration circuit 2. The larger the opening degree of the first regulating valve 28, the greater the amount of the refrigerant flowing into the evaporator flow path 2b. Accordingly, the amount of refrigerant flowing into the evaporator 26 becomes greater. Further, the larger the opening degree of the second regulating valve 29, the greater the amount of refrigerant flowing into the chiller flow path 2c and accordingly the greater the amount of refrigerant flowing into the chiller 27. Note that, in the present embodiment, the regulating valve 28 is configured as a valve able to be adjusted in opening degree, but it may also be an on-off valve switched between an opened state and a closed state. Further, instead of the first regulating valve 28 and the second regulating valve 29, it is also possible to provide a three-way valve able to make the refrigerant from the refrigerant basic flow path 2a selectively flow into only the evaporator flow path 2b, only the chiller flow path 2c, and/or both. Therefore, if possible to adjust the flow rate from the refrigerant basic flow path 2a to the evaporator flow path 2b and the chiller flow path 2c, as the circulation mode control device, some sort of valve may also be provided instead of these regulating valves 28 and 29.

Next, the low temperature circuit 3 will be explained. The low temperature circuit 3 includes a first pump 31, second pump 32, the cooling water piping 27b of the chiller 27, a low temperature radiator 33, first three-way valve 34, second three-way valve 35, and four-way valve 36. In addition, the low temperature circuit 3 includes the battery heat exchanger 37, PCU heat exchanger 38, and motor heat exchanger 39. In the low temperature circuit 3, the cooling water circulates through these components Note that, the cooling water is one example of the first heat medium. Inside the low temperature circuit 3, any other heat medium may be used instead of the cooling water.

The low temperature circuit 3 includes a first partial circuit 3a, second partial circuit 3b, and two bypass flow paths 3c and 3d. The first partial circuit 3a and the second partial circuit 3b are connected to each other through the four-way valve 36.

At the first partial circuit 3a, the first pump 31, the battery heat exchanger 37, the cooling water piping 27b of the chiller 27, and the four-way valve 36 are provided in that order in the direction of circulation of the cooling water. Further, a first bypass flow path 3c provided so as to bypass the battery heat exchanger 37 is connected to the first partial circuit 3a. In the present embodiment, one end of the first bypass flow path 3c is connected between the first pump 31 and the battery heat exchanger 37 in the direction of circulation of the cooling water. In addition, the other end of the first bypass flow path 3c is connected between the chiller 27 and the battery heat exchanger.

Further, at the second partial circuit 3b, the low temperature radiator 33, the second pump 32, the PCU heat exchanger 38, the four-way valve 36 and the motor heat exchanger 39 are provided in that order in the direction of circulation of the cooling water. At the second partial circuit 3b, a heat exchanger exchanging heat with heat generating equipment other than the battery, MG and PCU may also be provided.

The second bypass flow path 3d is connected to the first partial circuit 3a and the second partial circuit 3b so as to connect these circuits. In particular, one end of the second bypass flow path 3d is connected the second partial circuit 3b between the motor heat exchanger 39 and low temperature radiator 33, while the other end of the second bypass flow path 3d is connected the first partial circuit 3a between the cooling water piping 27b of the chiller 27 and the four-way valve 36. Note that, as long as the motor heat exchanger 39 can be bypassed, the second bypass flow path 3d need not be connected to both of the first partial circuit 3a and second partial circuit 3b, and may be connected to just the second partial circuit 3b.

The first pump 31 and the second pump 32 pump the cooling water circulating through the low temperature circuit 3. In the present embodiment, the first pump 31 and the second pump 32 are electrically driven water pumps, and are configured so as to be able to be changed in discharge capacities steplessly by adjustment of the electric power supplied to the first pump 31 and the second pump 32.

The low temperature radiator 33 is a heat exchanger exchanging heat with the cooling water circulating through the low temperature circuit 3 and the air outside of the vehicle 100 (outside air). The low temperature radiator 33 is configured to discharge heat from the cooling water to the outside air when the temperature of the cooling water is higher than the temperature of the outside air and to absorb heat from the outside air to the cooling water when the temperature of the cooling water is lower than the temperature of the outside air.

The first three-way valve 34 is configured to control the circulation mode of the cooling water flowing out from the first pump 31 and to enable the destination of flow of the cooling water to be selectively changed between the battery heat exchanger 37 and the first bypass flow path 3c. In the first partial circuit 3a, when the first three-way valve 34 is set at the battery heat exchanger 37 side, the cooling water flows through the first pump 31, the battery heat exchanger 37, and the cooling water piping 27b of the chiller 27 in that order of the components. On the other hand, when the first three-way valve 34 is set to the first bypass flow path 3c side, the cooling water does not circulate through the battery heat exchanger 37, therefore flows through only the first pump 31 and the cooling water piping 27b of the chiller 27.

The second three-way valve 35 is set at the connection part of the first partial circuit 3a and second bypass flow path 3d. The second three-way valve 35 controls the flow mode of the cooling water flowing out from the chiller 27, and is configured to be able to selectively change a component, into which the cooling water flows, between the four-way valve 36 and the low temperature radiator 33. When the second three-way valve 35 is set to the four-way valve 36 side, the cooling water flows through the cooling water piping 27b of the chiller 27, three-way valve 35, and four-way valve 36 in that order. On the other hand, when the second three-way valve 35 is set to the low temperature radiator 33 side, the cooling water flows through the cooling water piping 27b of the chiller 27, three-way valve 35, and low temperature radiator 33 in that order.

Note that, as long as it is possible to suitably adjust the flow rate of the cooling water flowing into the battery heat exchanger 37 and first bypass flow path 3c, a regulating valve or on-off valve or other device for controlling the flow mode may be used, instead of the first three-way valve 34. Similarly, as long as it is possible to suitably adjust the flow rate of the cooling water flowing into the four-way valve 36 and low temperature radiator 33, a regulating valve or on-off valve or other device for controlling the flow mode may be used, instead of the second three-way valve 35.

In particular, regarding the first three-way valve 34, as long as it is configured so that when the low temperature circuit 3 is in the later explained second state, it enables switching of the flow state between the state of connecting the battery heat exchanger 37 to the chiller 27, PCU heat exchanger 38, and low temperature radiator 33 so that cooling water flows therethrough and the state of not connecting the battery heat exchanger 37 to the chiller 27, PCU heat exchanger 38, and low temperature radiator 33 so that cooling water does not flows therethrough, any type of control device of the flow mode may be used.

Further, regarding the second three-way valve 35, as long as it is configured so that when the low temperature circuit 3 is in the later explained second state, it enables switching of the connection state between the state of connecting the motor heat exchanger 39 to the chiller 27, PCU heat exchanger 38, and low temperature radiator 33 so that cooling water flows therethrough and the state of not connecting the motor heat exchanger 39 to the chiller 27, PCU heat exchanger 38, and low temperature radiator 33 so that cooling water does not flow therethrough, any type of control device of the flow mode may be used.

Further, if the second bypass flow path 3d is connected to only the second partial circuit 3b, the second three-way valve 35 is configured to enable a component into which the cooling water flows, to be selectively changed between the motor heat exchanger 39 and the second bypass flow path 3d.

The four-way valve 36 is provided at a connection part between the first partial circuit 3a and the second partial circuit 3b, and controls the flow mode of cooling water between the first partial circuit 3a and the second partial circuit 3b. Specifically, the four-way valve 36 can switch the connection state between a first state where the first partial circuit 3a and the second partial circuit 3b are not connected with each other and a second state where the first partial circuit 3a and the second partial circuit 3b are connected with each other. Therefore, when the four-way valve 36 is in the first state, the battery heat exchanger 37 and the chiller 27 are connected so that the cooling water flows through them, and the PCU heat exchanger 38 and low temperature radiator 33 are connected so that the cooling water flows through them, while the battery heat exchanger 37 and the chiller 27 and the PCU heat exchanger 38 and low temperature radiator 33 are not connected in a state where the cooling water flows through them. On the other hand, when the four-way valve 36 is in a second state, the chiller 27, the PCU heat exchanger 38, and low temperature radiator 33 are connected so that the cooling water flows through them.

In particular, in the present embodiment, the four-way valve 36 is provided at the first partial circuit 3a between the chiller 27 and the first pump 31 and is provided at the second partial circuit 3b between the PCU heat exchanger 38 and the motor heat exchanger 39. Further, when the four-way valve 36 is in the first state, at the four-way valve 36, the first partial circuits 3a are connected with each other and the second partial circuits 3b are connected with each other. On the other hand, when the four-way valve 36 is in a second state, at the four-way valve 36, the first pump 31 side of the first partial circuit 3a and the PCU heat exchanger 38 side of the second partial circuit 3b are connected, and the second three-way valve 35 side of the first partial circuit 3a and the motor heat exchanger 39 side of the second partial circuit 3b are connected.

As a result, in the present embodiment, when the four-way valve 36 is in the first state, part of the cooling water flows through the first pump 31, battery heat exchanger 37, and chiller 27 in that order and, separately independently therefrom, the remaining cooling water flows through the low temperature radiator 33, PCU heat exchanger 38, and motor heat exchanger 39 in that order. On the other hand, when the four-way valve 36 is in the second state, the cooling water flows through the low temperature radiator 33, PCU heat exchanger 38, first pump 31, battery heat exchanger 37, chiller 27, and motor heat exchanger 39 in that order. Whatever the case, when the four-way valve 36 is in the second state, the cooling water preferably flows through at least the low temperature radiator 33, PCU heat exchanger 38, and motor heat exchanger 39 in that order.

That is, in the present embodiment, the low temperature circuit 3 is configured so as to switch the connection state between the first state and the second state. Further, in the low temperature circuit 3, in the first state, the battery heat exchanger 37 and the chiller 27 are connected so that the cooling water flows through them, and the PCU heat exchanger 38 and low temperature radiator 33 are connected so that the cooling water flows through them, while the battery heat exchanger 37 and the chiller 27 and the PCU heat exchanger 38 and low temperature radiator 33 are not connected in a state where the cooling water flow through them. Further, at the low temperature circuit 3, in the second state, the chiller 27 and PCU heat exchanger 38 and the low temperature radiator 33 are connected so that the cooling water flows through them.

In particular, in the present embodiment, when the low temperature circuit 3 is in the first state, the motor heat exchanger 39 is connected to the PCU heat exchanger 38 and low temperature radiator 33 so that the cooling water flows through them, and the battery heat exchanger 37 and the chiller 27 are not connected to the PCU heat exchanger 38, low temperature radiator 33, and motor heat exchanger 39 in a state where the cooling water flows through them.

Note that, as explained above, as long as it is possible to switch connection states at the low temperature circuit 3, a plurality of on-off valves or other control devices of the connection state may be used instead of the four-way valve 36.

The battery heat exchanger 37 functions as a heat generating device heat exchanger for exchanging heat with a battery (not shown) of the vehicle 100, which is a heat generating device. Specifically, the battery heat exchanger 37, for example, is provided with piping provided around the battery, and is configured to exchange heat between the cooling water flowing through the piping and the battery. Note that, the battery of the vehicle 100 is connected to the PCU and motor of the vehicle 100 explained later, and supplies electric power for driving the vehicle 100 to the motor. Note that, the battery supplies electric power to, for example, the motor of the vehicle 100. Note that, in the present embodiment, as the motor for driving the vehicle 100, a motor-generator (MG) having an electric power generating function is used.

Further, the PCU heat exchanger 38 functions as a heat generating device heat exchanger for exchanging heat with a power control unit (PCU, not shown) of the vehicle 100, which is a heat generating device. Specifically, the PCU heat exchanger 38 is provided with piping provided around the PCU and is configured to exchange heat between the cooling water flowing through this piping and the battery. Note that, the PCU is connected between the battery and MG and controls the electric power supplied to the MG. The PCU has an inverter driving the MG, a booster converter controlling the voltage, a DC-DC converter lowering the high voltage, and other heat generating components.

The motor heat exchanger 39 functions as a heat generating device heat exchanger exchanging heat with the MG of the vehicle 100, which is a heat generating device. Specifically, the motor heat exchanger 39 is configured so as to exchange heat between the oil flowing around the MG and the cooling water. Note that, the oil flow path may be configured so that the oil exchanging heat with the motor heat exchanger 39 flows around the transaxle in addition to the MG. In this case, the motor heat exchanger 39 exchanges heat with the MG and in addition the transaxle. Note that, the MG is used to drive the vehicle 100 or to regenerate power when braking the vehicle 100.

Next, the high temperature circuit 4 will be explained. The high temperature circuit 4 includes a third pump 41, the cooling water piping 22*b* of the condenser 22, a high temperature radiator 42, a third three-way valve 43, an electric heater 44, and a heater core 45. In the high temperature circuit 4 as well, the cooling water circulates through these components. Note that, this cooling water is one example of the second heat medium. Inside the high temperature circuit 4, any other heat medium may be used instead of the cooling water.

Further, the high temperature circuit 4 is divided into a high temperature basic flow path 4*a*, radiator flow path 4*b*, and heater flow path 4*c*. The radiator flow path 4*b* and the heater flow path 4*c* are provided parallel to each other, and are respectively connected to the high temperature basic flow path 4*a*.

At the high temperature basic flow path 4*a*, a third pump 41 and the cooling water piping 22*b* of the condenser 22 are provided in that order in the direction of circulation of the cooling water. At the radiator flow path 4*b*, a high temperature radiator 42 is provided. Further, at the heater flow path 4*c*, an electric heater 44 and heater core 45 are provided in that order in the direction of circulation of the cooling water. A third three-way valve 43 is provided between the high temperature basic flow path 4*a*, and radiator flow path 4*b* and the heater flow path 4*c*.

The third pump 41 pumps the cooling water circulated through the high temperature circuit 4. In the present embodiment, the third pump 41 is an electric type water pump similar to the first pump 31. Further, the high temperature radiator 42, in the same way as the low temperature radiator 33, is a heat exchanger exchanging heat between the cooling water circulating through the high temperature circuit 4 and the outside air.

The third three-way valve 43 functions as a circulation mode control device controlling the mode of circulation of the cooling water flowing out from the cooling water piping 22*b* of the condenser 22, and is configured so as to be able to selectively change the destination of circulation between the radiator flow path 4*b* and the heater flow path 4*c*. If the third three-way valve 43 is set at the radiator flow path 4*b* side, the cooling water flowing out from the cooling water piping 22*b* of the condenser 22 flows through the radiator flow path 4*b*. On the other hand, if the third three-way valve 43 is set at the heater flow path 4*c* side, the cooling water flowing out from the cooling water piping 22*b* of the condenser 22 flows through the electric heater 44 and heater core 45. Note that, if possible to suitably adjust the flow rate of cooling water flowing into the radiator flow path 4*b* and heater flow path 4*c*, an adjusting valve or on-off valve or other circulation mode control device may be used instead of the third three-way valve 43.

The electric heater 44 functions as a heater heating the cooling water. The electric heater 44 is, for example, provided with a resistance heating element placed around the piping through which the cooling water flows, and is configured so that the cooling water in the piping is heated by supplying electric power to this resistance heating element. The electric heater 44 is, for example, used for heating, when the temperature of the outside air is extremely low and as a result the refrigerant does not suitably function in the refrigeration circuit 2. Note that the electric heater 44 may be disposed in a different position, as long as the cooling water heated by the electric heater can be supplied to the heater core 45. Specifically, the electric heater 44 may be provided, for example, at the high temperature basic flow path 4*a* between the condenser 22*b* and the third three-way valve 43.

The heater core 45 is configured to exchange heat between the cooling water circulating through the high temperature circuit 4 and the air surrounding the heater core 45 to thereby heat the passenger compartment. Specifically, the heater core 45 is configured so as to discharge heat from the cooling water to the air surrounding the heater core 45. Therefore, if high temperature cooling water flows to the heater core 45, the temperature of the cooling water is decreased and the air surrounding the heater core 45 is warmed.

FIG. 2 is a view of the configuration schematically showing the air passage 6 for air-conditioning the vehicle 100 mounting the vehicle-mounted temperature controller 1. In the air passage 6, air flows in the direction shown by the arrow marks in the figure. The air passage 6 shown in FIG. 2 is connected to the outside of the vehicle 100 or the air intake openings of the passenger compartment. The outside air or the air inside the passenger compartment flows into the air passage 6, according to the state of control by the control device 5. Further, the air passage 6 shown in FIG. 2 is connected to air vent openings blowing air into the passenger compartment. Air is supplied from the air passage 6 to any of the air vent openings according to the state of control by the control device 5.

As shown in FIG. 2, at the air passage 6 for air-conditioning of the present embodiment, a blower 61, evaporator 26, air mix door 62, and heater core 45 are provided in that order in the direction of flow of the air.

The blower 61 is provided with a blower motor 61*a* and a blower fan 61*b*. The blower 61 is configured so that if the blower fan 61*b* is driven by the blower motor 61*a*, the outside air or the air inside the passenger compartment flows into the air passage 6 and the air flows through the air passage 6.

The air mix door 62 adjusts the flow rate of the air flowing through the heater core 45 in the air flowing through the air passage 6. The air mix door 62 is configured to be able to be adjusted among the state where all of the air flowing through the air passage 6 flows through the heater core 45, the state where none of the air flowing through the air passage 6 flows through the heater core 45, and states between them.

In the thus configured air passage 6, when the blower 61 is driven, if the refrigerant circulates through the evaporator 26, the air flowing through the air passage 6 is cooled. Further, when the blower 61 is driven, if the cooling water circulates to the heater core 45 and the air mix door 62 is controlled so that air flows through the heater core 45, the air flowing through the air passage 6 is warmed.

FIG. 3 is a view schematically showing the vehicle 100 mounting the vehicle-mounted temperature controller 1. As shown in FIG. 3, at the inside of the front grille of the vehicle 100, a low temperature radiator 33 and high temperature radiator 42 are arranged. Therefore, when the vehicle 100 is running, wind generated based on movement of vehicle strikes these radiators 33 and 42. Further, a fan 71 is provided adjacent to these radiators 33 and 42. The fan 71 is configured so that if driven, the air strikes the radiators 33 and 42. Therefore, even when the vehicle 100 is not running, by driving the fan 71, it is possible to make air strike the radiators 33 and 42.

Referring to FIG. 1, the control device 5 is provided with an electronic control unit (ECU) 51. The ECU 51 is provided with a processor for performing various types of processing, a memory storing programs and various types of information, and an interface connected with various actuators and various sensors.

Further, the control device 5 is provided with a battery temperature sensor 52 detecting the temperature of the battery, a first water temperature sensor 53 detecting the temperature of the cooling water flowing through the second partial circuit 3b (in particular, the temperature of the cooling water flowing out from the second pump 32 and flowing into the PCU heat exchanger 38), and a second water temperature sensor 54 detecting the temperature of the cooling water flowing into the heater core 45. The ECU 51 is connected to these sensors, and output signals from these sensors are input to the ECU 51.

In addition, the ECU 51 is connected to various types of actuators of the vehicle-mounted temperature controller 1 and controls these actuators. Specifically, the ECU 51 is connected to the compressor 21, the regulating valves 28 and 29, the pumps 31 and 32, and 41, the three-way valves 34, 35, and 43, the four-way valve 36, the electric heater 44, the blower motor 61a, the air mix door 62, and the fan 71 and controls the same.

Operation of Vehicle-Mounted Temperature Controller

Next, referring to FIGS. 4 to 14, typical operating states of the vehicle-mounted temperature controller 1 will be explained. In FIGS. 4 to 14, a flow path through which the refrigerant or the cooling water flows is shown by a solid line, while a flow path through which the refrigerant or cooling water does not flow is shown by a broken line. Further, thin arrow marks in the figures show directions of flow of the refrigerant or cooling water, while thick arrow marks show directions of movement of heat.

In the present embodiment, the operating states at the low temperature circuit 3 of the vehicle-mounted temperature controller 1 are divided into mainly the four modes of the first mode to the fourth mode. In these operating states, the connection states between the devices provided at the low temperature circuit 3 differ. Below, these four operating states will be explained.

Figure 4:
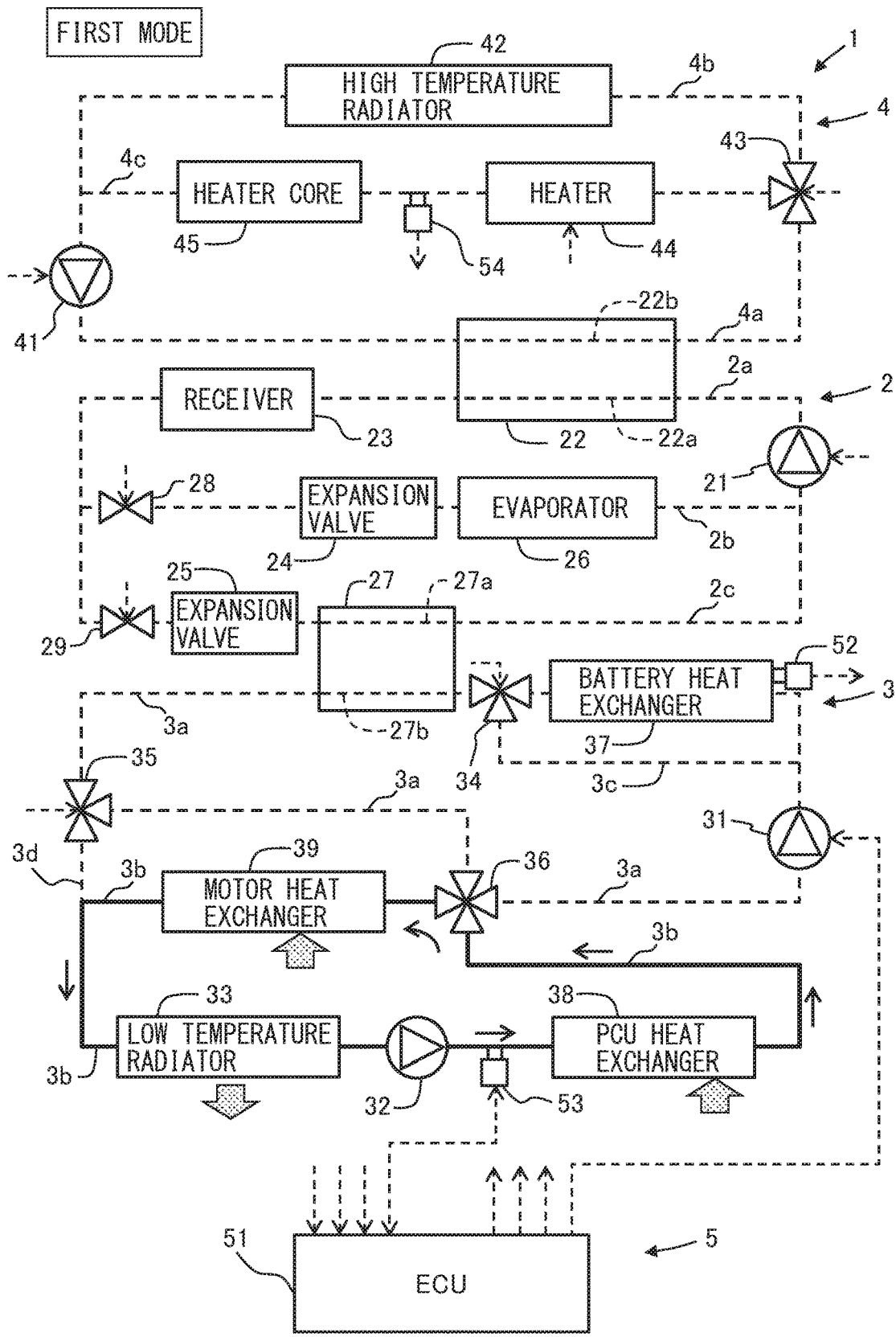
FIG. 4 shows one example of the operating state of the vehicle-mounted temperature controller in the case where the operating state of the low temperature circuit is in a first mode.
Figure 5:
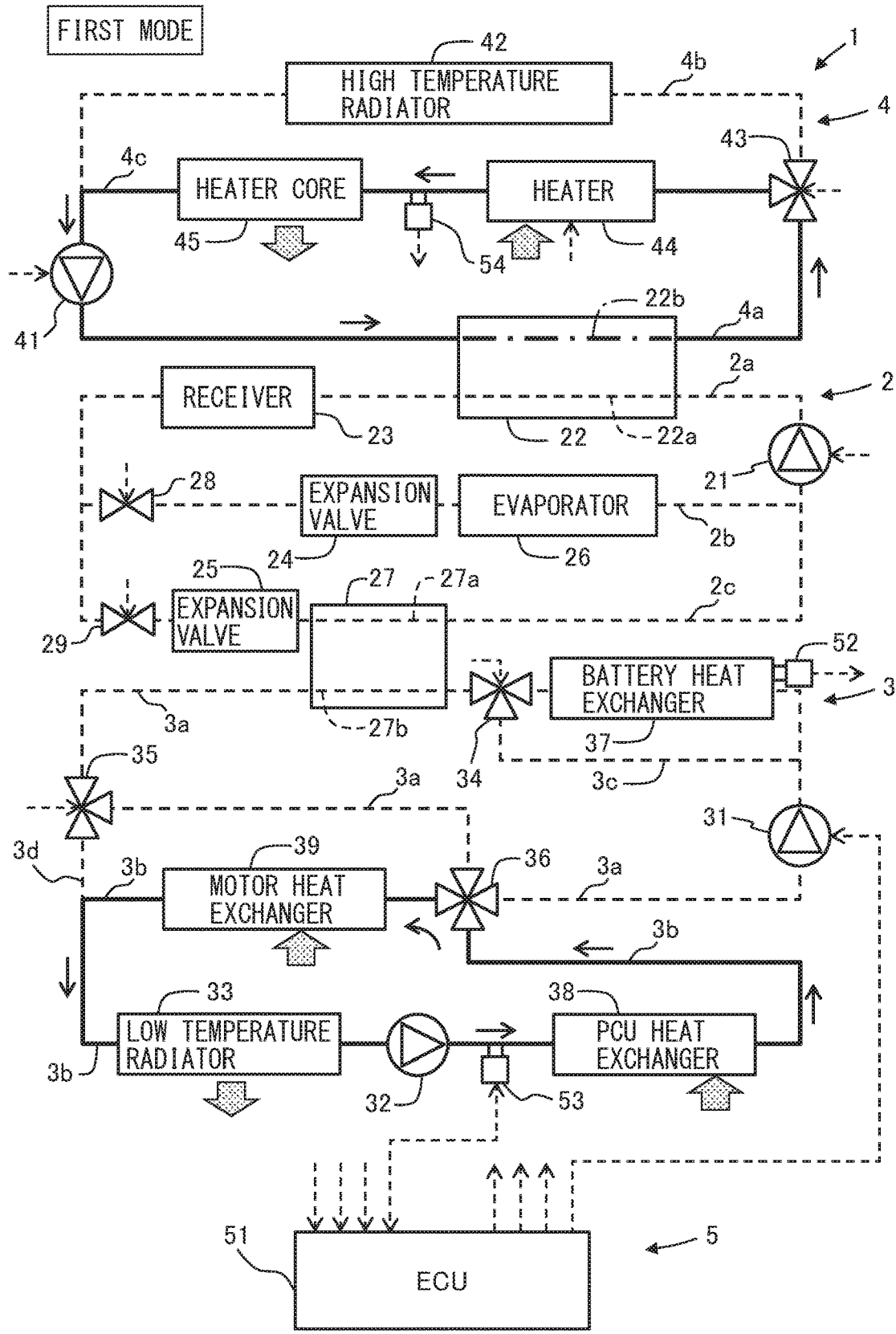
FIG. 5 shows one example of the operating state of the vehicle-mounted temperature controller in the case where the operating state of the low temperature circuit is in the first mode.
Figure 6:
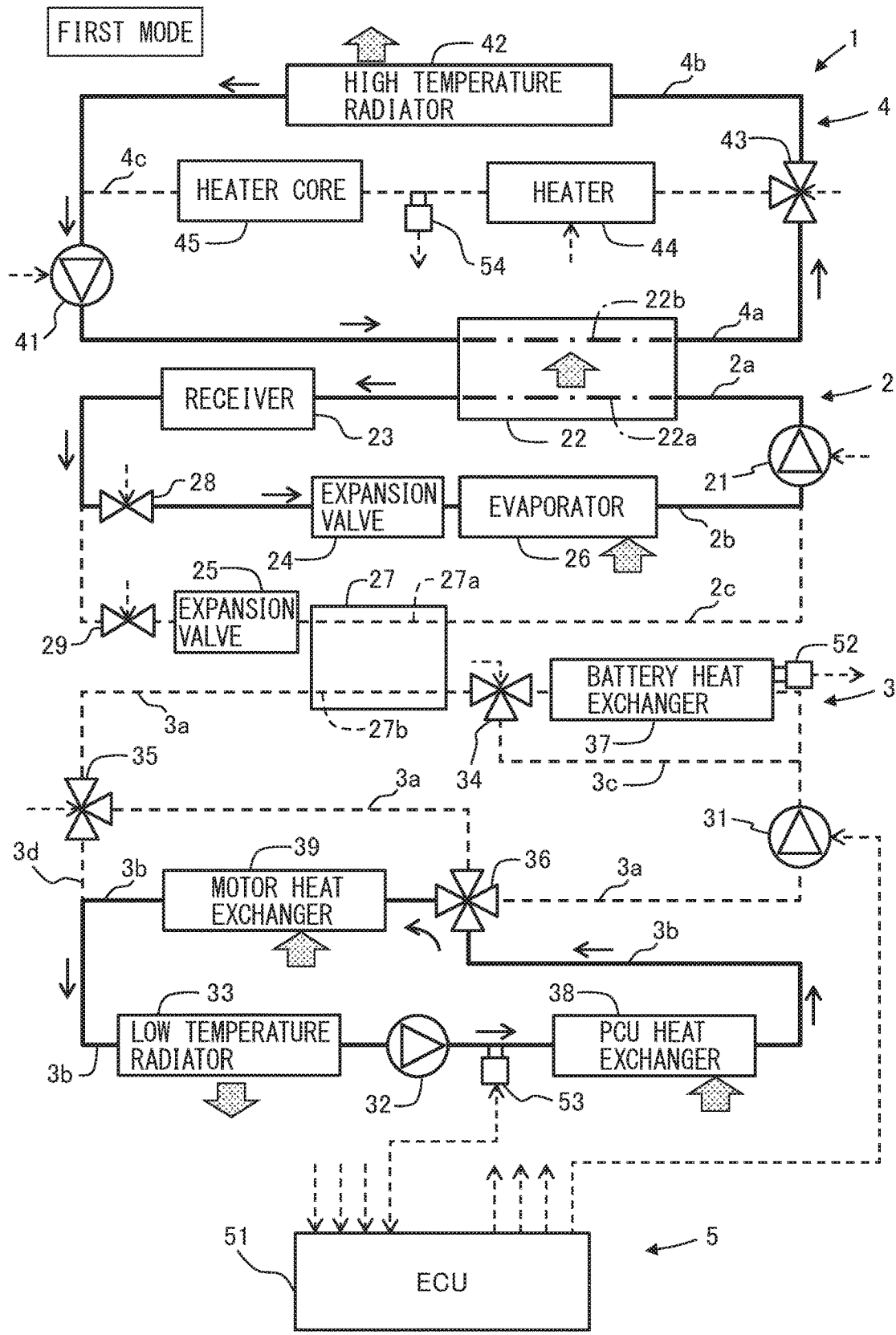
FIG. 6 shows one example of the operating state of the vehicle-mounted temperature controller in the case where the operating state of the low temperature circuit is in the first mode.

FIGS. 4 to 6 show the operating state of the vehicle-mounted temperature controller 1 when the operating state of the low temperature circuit 3 is in the first mode. As will be understood from FIGS. 4 to 6, in the first mode, the first pump 31 is stopped and the second pump 32 is operated. In addition, the four-way valve 36 is set to the first state. Therefore, the first partial circuit 3a and the second partial circuit 3b are not connected with each other.

As a result, when the operating state of the low temperature circuit 3 is in the first mode, the cooling water in the second partial circuit 3b of the low temperature circuit 3 circulates through the second pump 32, PCU heat exchanger 38, motor heat exchanger 39, and low temperature radiator 33 in that order. Therefore, the cooling water in the low temperature circuit 3 absorbs heat from the PCU and MG at the PCU heat exchanger 38 and motor heat exchanger 39, and discharges heat into the outside air at the low temperature radiator 33. As a result, the PCU and MG are cooled. On the other hand, since the first pump 31 is stopped, the cooling water in the first partial circuit 3a of the low temperature circuit 3 does not circulate. Therefore, at the battery heat exchanger 37 and the chiller 27, there is almost no movement of heat between the cooling water and battery or refrigerant. As a result, the battery is not cooled much at all.

In particular, in the example shown in FIG. 4, the compressor 21 and third pump 41 are also stopped. Therefore, in the refrigeration circuit 2, the refrigeration cycle is not realized. Accordingly, at the chiller 27 and condenser 22, there is almost no movement of heat between the cooling water and refrigerant. The vehicle-mounted temperature controller 1 is, for example, set to the operating state shown in FIG. 4, if the temperature of the battery is low and neither heating nor cooling in the compartment of the vehicle 100 is demanded.

Further, in the example shown in FIG. 5, the compressor 21 is stopped, but the third pump 41 is operated. In addition, the three-way valve 43 of the high temperature circuit 4 is set to the heater flow path 4c side, and electric power is supplied to the electric heater 44.

In the example shown in FIG. 5, the compressor 21 is stopped, therefore the refrigeration cycle is not realized in the refrigeration circuit 2. Accordingly, in the chiller 27 and condenser 22, there is almost no movement of heat between the cooling water and the refrigerant. On the other hand, the cooling water in the high temperature circuit 4 circulates through the third pump 41, cooling water piping 22b of the condenser 22, electric heater 44, and heater core 45 in that order. In addition, the cooling water in the high temperature circuit 4 is raised in temperature at the electric heater 44. As a result, the cooling water in the high temperature circuit 4 absorbs heat at the electric heater 44, and discharges heat to the surrounding air at the heater core 45. Due to the discharge of heat, the inside of the compartment of the vehicle 100 is heated. The vehicle-mounted temperature controller 1 is, for example, set to the operating state shown in FIG. 5 if the temperature of the battery is low, heating of the inside of the compartment of the vehicle 100 is demanded, and the temperature of the cooling water in the low temperature circuit 3 is extremely low (for example, equal to or less than −20).

Furthermore, in the example shown in FIG. 6, the compressor 21 and third pump 41 are both operated. In addition, the first regulating valve 28 of the refrigeration circuit 2 is opened and the second regulating valve 29 is closed. Further, the three-way valve 43 of the high temperature circuit 4 is set to the radiator flow path 4b side.

In the example shown in FIG. 6, the compressor 21 is operated, therefore the refrigerant circulates in the refrigeration circuit 2. In particular, the first regulating valve 28 is opened and the second regulating valve 29 is closed, therefore the refrigerant in the refrigeration circuit 2 circulates through the compressor 21, refrigerant piping 22a of the condenser 22, receiver 23, first expansion valve 24, and evaporator 26 in that order. As a result, the refrigerant in the refrigeration circuit 2 absorbs heat from the surrounding air at the evaporator 26, and discharges heat to the cooling water of the high temperature circuit 4 at the condenser 22. Due to this absorption of heat, the inside of the compartment of the vehicle 100 is cooled.

On the other hand, the cooling water in the high temperature circuit 4 circulates through the third pump 41, cooling water piping 22b of the condenser 22, and high temperature radiator 42 in that order. As a result, the cooling water in the high temperature circuit 4 absorbs heat from the refrigerant at the condenser 22, and discharges heat into the atmosphere at the high temperature radiator 42. Therefore, in the example shown in FIG. 6, the heat absorbed at the evaporator 26 is discharged at the high temperature radiator 42. The vehicle-mounted temperature controller 1 is, for example, set to the operating state shown in FIG. 6 if the temperature of the battery is low and cooling of the inside of the compartment of the vehicle 100 is demanded.

Figure 7:
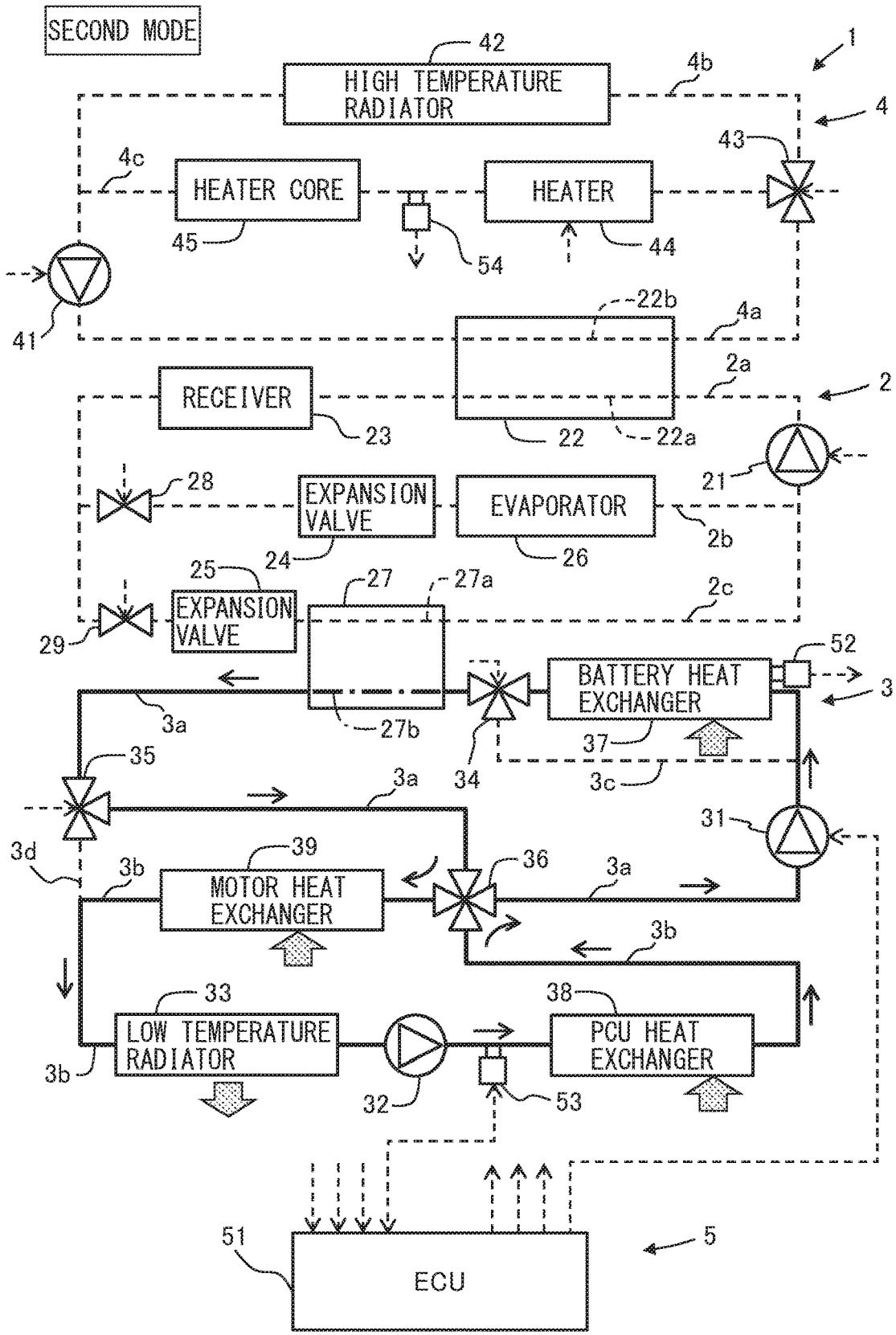
FIG. 7 shows one example of the operating state of the vehicle-mounted temperature controller in the case where the operating state of the low temperature circuit is in a second mode.
Figure 8:
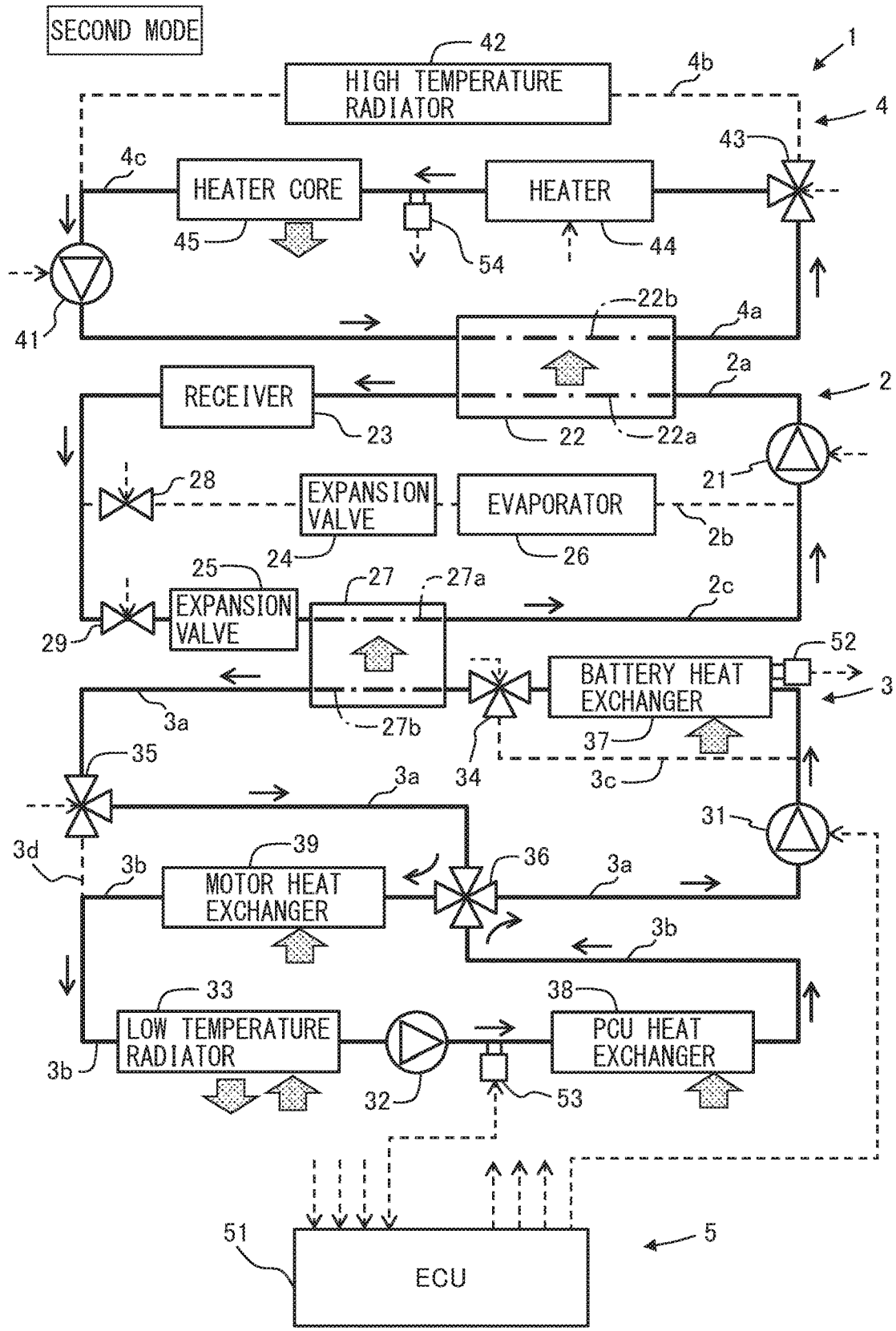
FIG. 8 shows one example of the operating state of the vehicle-mounted temperature controller in the case where the operating state of the low temperature circuit is in the second mode.
Figure 9:
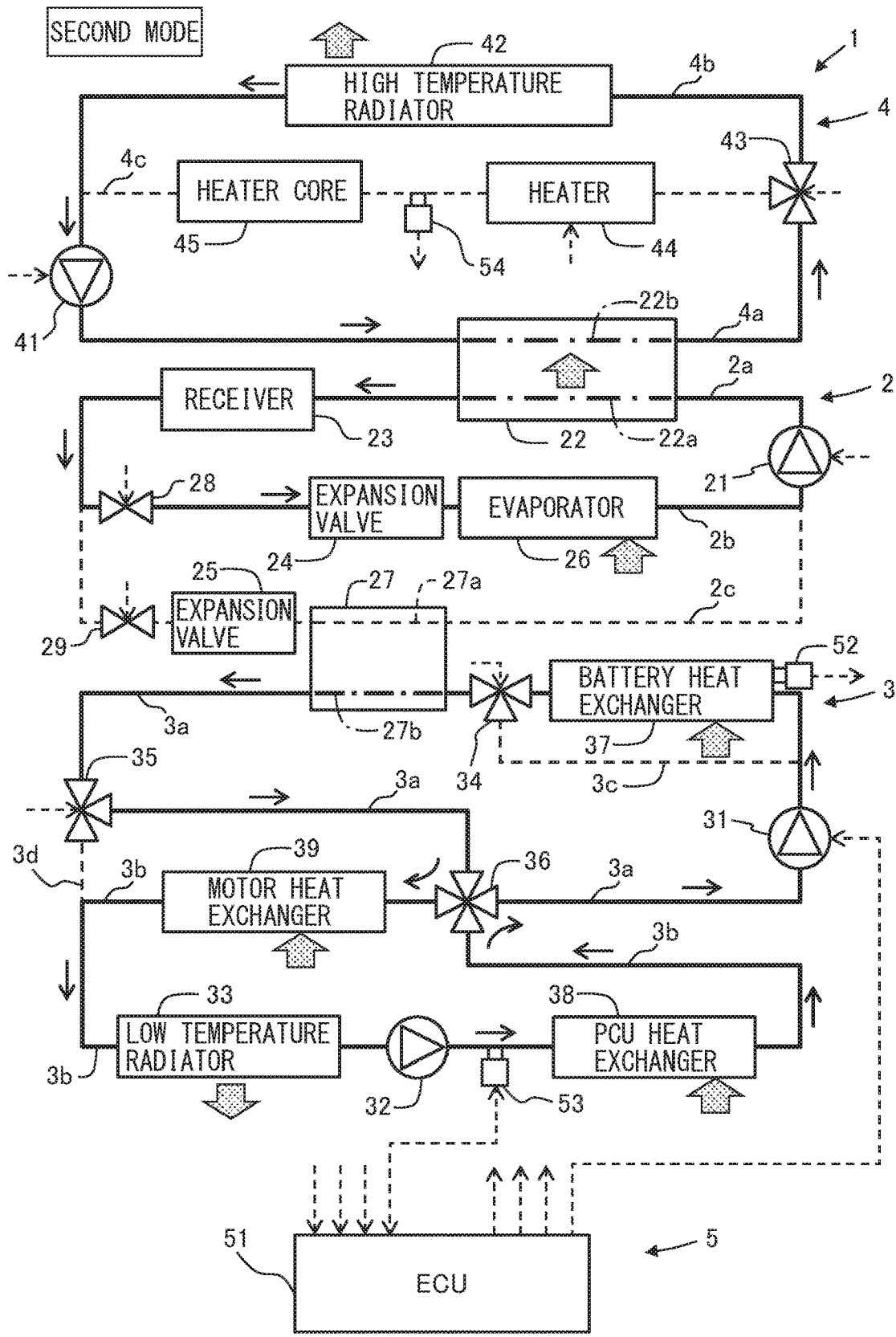
FIG. 9 shows one example of the operating state of the vehicle-mounted temperature controller in the case where the operating state of the low temperature circuit is in the second mode.

FIGS. 7 to 9 show the operating state of the vehicle-mounted temperature controller 1 in the case where the operating state of the low temperature circuit 3 is in the second mode. As will be understood from FIGS. 7 to 9, at the second mode, the first pump 31 and second pump 32 are both operated. In addition, the four-way valve 36 is set to the second state. Therefore, the first partial circuit 3a and the second partial circuit 3b are connected with each other. In addition, the first three-way valve 34 is set to the battery heat exchanger 37 side, while the second three-way valve 35 is set to the four-way valve 36 side. Note that, in the second mode, only one pump among the first pump 31 and second pump 32 may be operated.

As a result, if the operating state of the low temperature circuit 3 is in the second mode, the cooling water of the low temperature circuit 3 circulates through the first pump 31, battery heat exchanger 37, cooling water piping 27b of the chiller 27, motor heat exchanger 39, low temperature radiator 33, second pump 32, and PCU heat exchanger 38 in that order. Therefore, the cooling water of the low temperature circuit 3 basically absorbs heat from the battery, PCU, and MG at the battery heat exchanger 37, PCU heat exchanger 38, and motor heat exchanger 39, respectively, and discharges heat into the outside air at the low temperature radiator 33. As a result, the battery, PCU, and MG are cooled.

In particular, in the example shown in FIG. 7, the compressor 21 and third pump 41 are stopped. Therefore, in the refrigeration circuit 2, the refrigeration cycle is not realized. Accordingly, in the chiller 27 and condenser 22, there is almost no movement of heat between the cooling water and the refrigerant. The vehicle-mounted temperature controller 1 is, for example, set to the operating state shown in FIG. 7, when the temperature of the battery is high to a certain extent and neither heating nor cooling of the inside of the compartment of the vehicle 100 is demanded.

Further, in the example shown in FIG. 8, the compressor 21 and third pump 41 are operated. In addition, the first regulating valve 28 of the refrigeration circuit 2 is closed and the second regulating valve 29 is opened. Furthermore, the three-way valve 43 of the high temperature circuit 4 is set to the heater flow path 4c side.

In the example shown in FIG. 8, the compressor 21 is operated, therefore refrigerant circulates in the refrigeration circuit 2. In particular, the first regulating valve 28 is closed and the second regulating valve 29 is opened, therefore the refrigerant in the refrigeration circuit 2 circulates through the compressor 21, refrigerant piping 22a of the condenser 22, receiver 23, second expansion valve 25, and refrigerant piping 27a of the chiller 27 in that order. As a result, the refrigerant in the refrigeration circuit 2 absorbs heat from the cooling water of the low temperature circuit 3 at the chiller 27, and discharges heat to the cooling water of the high temperature circuit 4 at the condenser 22.

On the other hand, the third pump 41 is operated, therefore the cooling water in the high temperature circuit 4 circulates through the third pump 41, cooling water piping 22b of the condenser 22, and heater core 45 in that order. As a result, the cooling water in the high temperature circuit 4 absorbs heat from the refrigerant in the refrigeration circuit 2 at the condenser 22, and discharges heat to the surrounding air at the heater core 45. Due to this discharge of heat, the inside of the compartment of the vehicle 100 is heated. The vehicle-mounted temperature controller 1 is, for example, set to the operating state shown in FIG. 8, when the temperature of the battery is high to a certain extent and heating of the inside of the compartment of the vehicle 100 is demanded.

Note that, as explained above, when the operating state of the low temperature circuit 3 is in the second mode, the cooling water in the low temperature circuit 3 basically absorbs heat from the battery, PCU, and MG at the battery heat exchanger 37, PCU heat exchanger 38, and motor heat exchanger 39, respectively, and discharges heat into the outside air at the low temperature radiator 33. However, in the operating state shown in FIG. 8, when the amount of heat discharged from the cooling water of the low temperature circuit 3 to the refrigerant of the refrigeration circuit 2 at the chiller 27 is large, the cooling water of the low temperature circuit 3 may also absorb heat from the outside air at the low temperature radiator 33.

Furthermore, in the example shown in FIG. 9, the compressor 21 and third pump 41 are both operating. In addition, the first regulating valve 28 of the refrigeration circuit 2 is open and the second regulating valve 29 is closed. Further, the three-way valve 43 of the high temperature circuit 4 is set to the radiator flow path 4b side.

In the example shown in FIG. 9, the compressor 21 is operated, therefore the refrigerant circulates in the refrigeration circuit 2. In particular, the first regulating valve 28 is open and the second regulating valve 29 is closed, therefore the refrigerant in the refrigeration circuit 2 circulates through the compressor 21, refrigerant piping 22a of the condenser 22, receiver 23, first expansion valve 24, and evaporator 26 in that order. As a result, the refrigerant in the refrigeration circuit 2 absorbs heat from the surrounding air at the evaporator 26, and discharges heat to the cooling water of the high temperature circuit 4 at the condenser 22. Due to this absorption of heat, the inside of the compartment of the vehicle 100 is cooled.

On the other hand, the cooling water in the high temperature circuit 4 circulates through the third pump 41, cooling water piping 22b of the condenser 22, and high temperature radiator 42 in that order. As a result, the cooling water in the high temperature circuit 4 absorbs heat from the refrigerant at the condenser 22, and discharges heat into the atmosphere at the high temperature radiator 42. Therefore, in the example shown in FIG. 9, the heat absorbed at the evaporator 26 is discharged at the high temperature radiator 42. The vehicle-mounted temperature controller 1, for example, is set to the operating state shown in FIG. 9, when the temperature of the battery is high to a certain extent and cooling of the inside of the compartment of the vehicle 100 is demanded.

Figure 10:
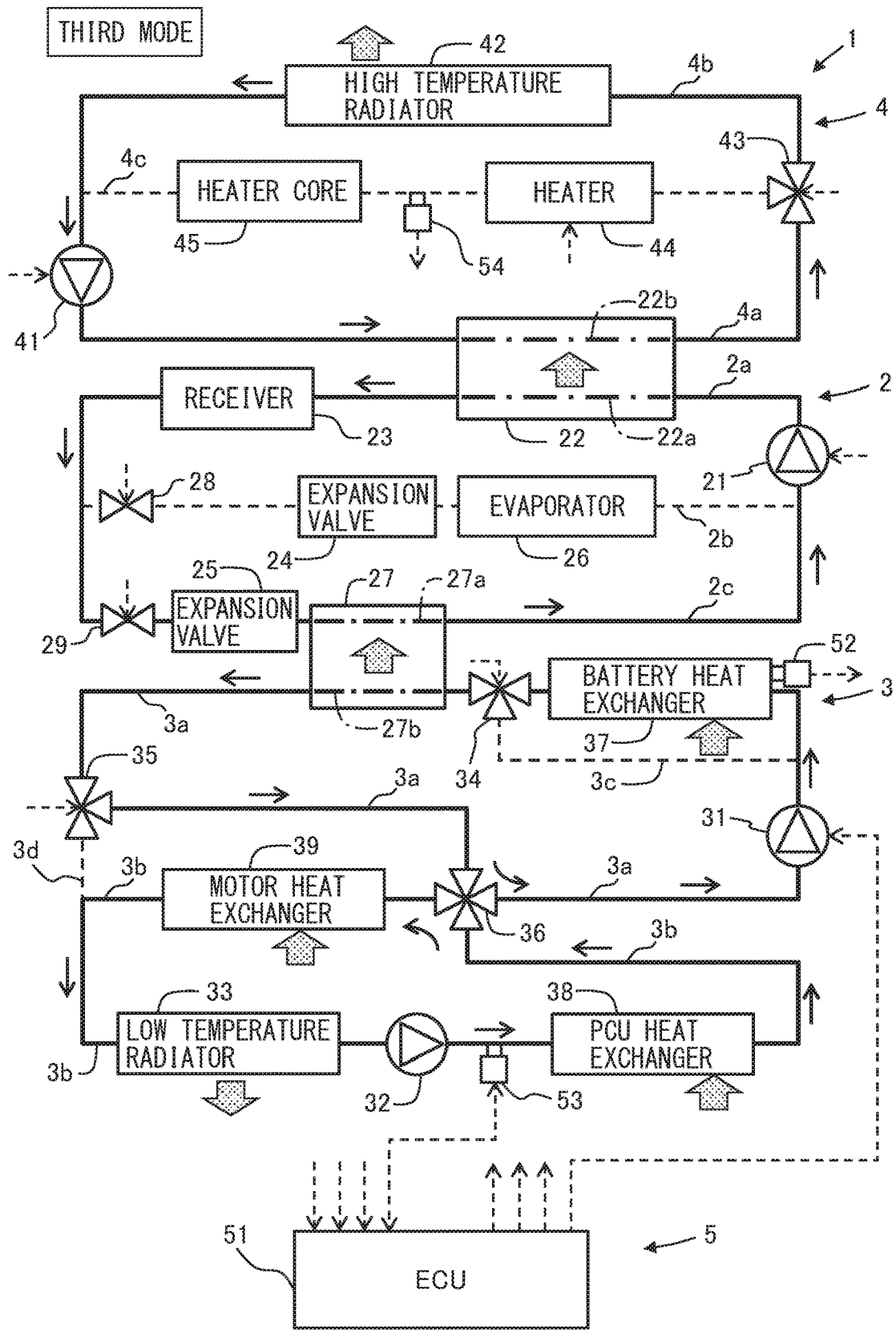
FIG. 10 shows one example of the operating state of the vehicle-mounted temperature controller in the case where the operating state of the low temperature circuit is in a third mode.
Figure 11:
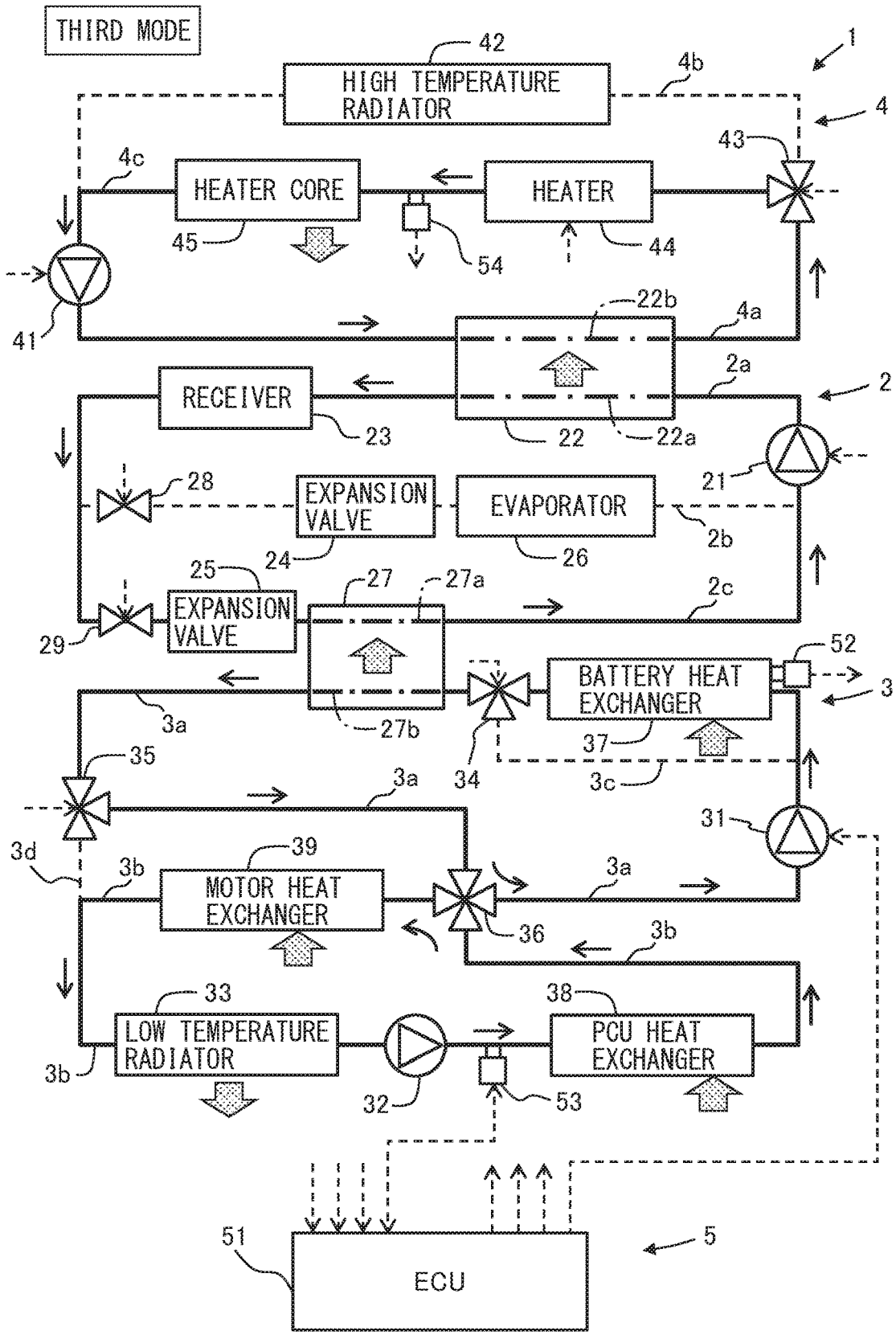
FIG. 11 shows one example of the operating state of the vehicle-mounted temperature controller in the case where the operating state of the low temperature circuit is in the third mode.
Figure 12:
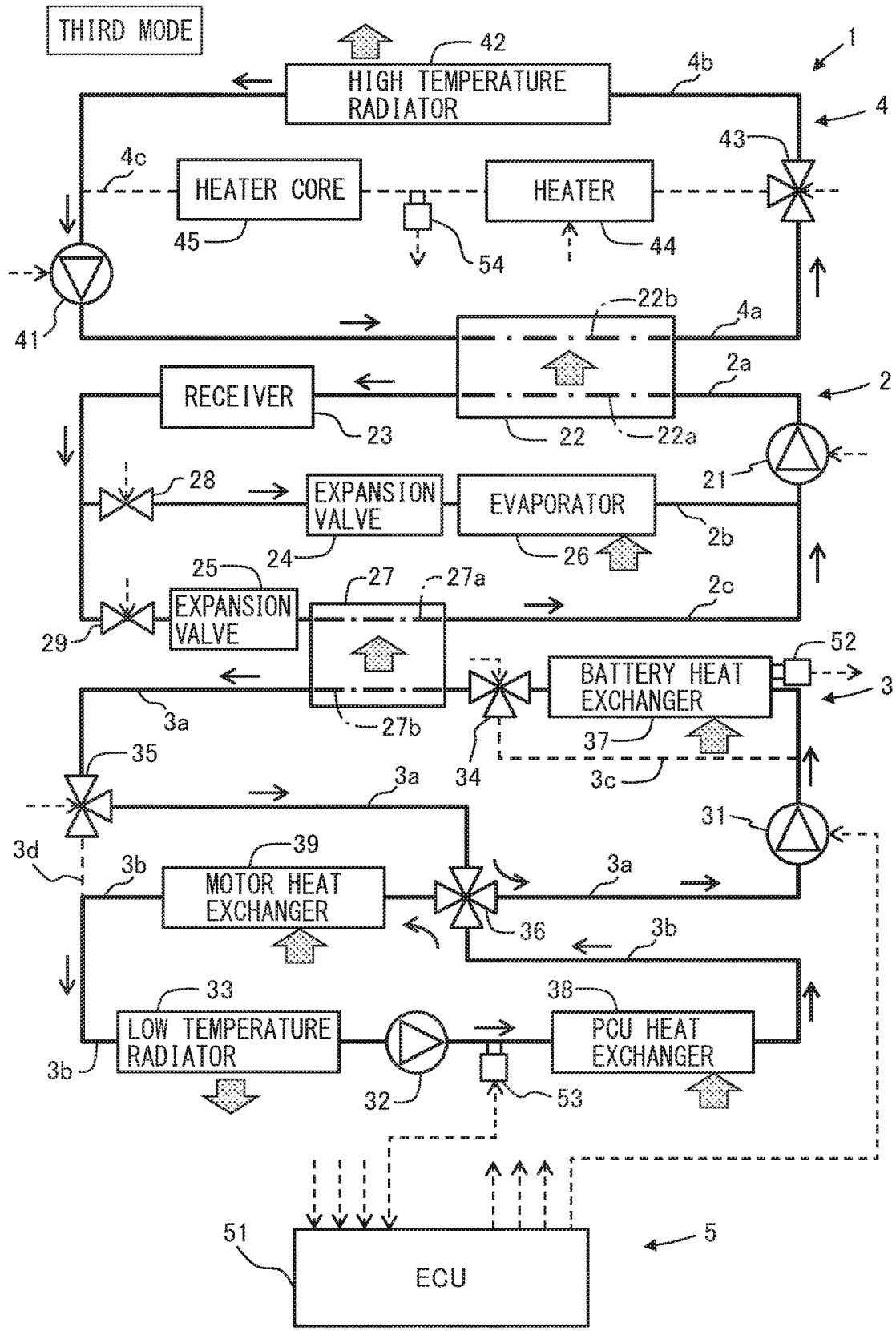
FIG. 12 shows one example of the operating state of the vehicle-mounted temperature controller in the case where the operating state of the low temperature circuit is in the third mode.

FIGS. 10 to 12 show the operating state of the vehicle-mounted temperature controller 1 in the case where the operating state of the low temperature circuit 3 is in the third mode. As will be understood from FIGS. 10 to 12, in the third mode, the first pump 31 and second pump 32 are both operated. In addition, the four-way valve 36 is set to the first state. Therefore, the first partial circuit 3a and second partial circuit 3b are not connected with each other.

As a result, if the operating state of the low temperature circuit 3 is in the third mode, the cooling water in the first partial circuit 3a of the low temperature circuit 3 circulates through the first pump 31, battery heat exchanger 37, and cooling water piping 27b of the chiller 27 in that order. Therefore, the cooling water in the first partial circuit 3a absorbs heat at the battery heat exchanger 37 and discharges heat to the refrigerant of the refrigeration circuit 2 at the chiller 27. As a result, the battery is rapidly cooled. On the other hand, the cooling water in the second partial circuit 3b of the low temperature circuit 3 circulates through the second pump 32, PCU heat exchanger 38, motor heat exchanger 39, and low temperature radiator 33 in that order. Therefore, the cooling water of the low temperature circuit 3 absorbs heat from the PCU and MG at the PCU heat exchanger 38 and motor heat exchanger 39 respectively, and discharges heat to the outside air at the low temperature radiator 33. As a result, the PCU and MG are cooled.

In particular, in the example shown in FIG. 10, the compressor 21 and third pump 41 are operated. In addition, the first regulating valve 28 of the refrigeration circuit 2 is closed and the second regulating valve 29 is opened. Furthermore, the three-way valve 43 of the high temperature circuit 4 is set to the radiator flow path 4b side.

In the example shown in FIG. 10, the compressor 21 is operated, therefore refrigerant circulates in the refrigeration circuit 2. In particular, the first regulating valve 28 is closed and the second regulating valve 29 is open, therefore the refrigerant in the refrigeration circuit 2 circulates through the compressor 21, refrigerant piping 22a of the condenser 22, receiver 23, second expansion valve 25, and refrigerant piping 27a of the chiller 27 in that order. As a result, the refrigerant in the refrigeration circuit 2 absorbs heat from the cooling water in the low temperature circuit 3 at the chiller 27, and discharges heat to the cooling water of the high temperature circuit 4 at the condenser 22.

Further, the third pump 41 is operated, therefore the cooling water in the high temperature circuit 4 circulates through the third pump 41, cooling water piping 22b of the condenser 22, and high temperature radiator 42 in that order. As a result, the cooling water in the high temperature circuit 4 absorbs heat from the refrigerant in the refrigeration circuit 2 at the condenser 22, and discharges heat into the outside air at the high temperature radiator 42. Therefore, the heat absorbed from the cooling water in the low temperature circuit 3 at the chiller 27 is discharged into the outside air at the high temperature radiator 42. The vehicle-mounted temperature controller 1 is, for example, set to the operating state shown in FIG. 10, when the temperature of the battery is extremely high and neither heating nor cooling of the inside of the compartment of the vehicle 100 is demanded.

Further, in the example shown in FIG. 11, the vehicle-mounted temperature controller 1 is in an operating state similar to the example shown in FIG. 10, except for the third three-way valve 43 being set at the heater flow path 4c side. Therefore, in the example shown in FIG. 11, the cooling water in the high temperature circuit 4 circulates through the third pump 41, cooling water piping 22b of the condenser 22, and heater core 45 in that order. As a result, the cooling water in the high temperature circuit 4 absorbs heat from the refrigerant in the refrigeration circuit 2 at the condenser 22, and discharges heat to the surrounding air at the high temperature radiator 42. Due to this discharge of heat, the inside of the compartment of the vehicle 100 is heated. If, for example, the temperature of the battery is extremely high and heating of the inside of the compartment of the vehicle 100 is demanded, the vehicle-mounted temperature controller 1 is set to the operating state shown in FIG. 11.

Furthermore, in the example shown in FIG. 12, the vehicle-mounted temperature controller 1 is in an operating state similar to the example shown in FIG. 10, except for the first regulating valve 28 being opened. Therefore, in the example shown in FIG. 12, the refrigerant in the refrigeration circuit 2 flows to both of the evaporator 26 and refrigerant piping 27a of the chiller 27. As a result, the refrigerant in the refrigeration circuit 2 absorbs heat from the surrounding air at the evaporator 26, absorbs heat from the cooling water in the low temperature circuit 3 at the chiller 27, and discharges heat to the cooling water of the high temperature circuit 4 at the condenser 22. Due to the absorption of heat at the evaporator 26, the inside of the compartment of the vehicle 100 is cooled. The vehicle-mounted temperature controller 1 is for example set to the operating state shown in FIG. 12, when the temperature of the battery is extremely high and cooling of the inside of the compartment of the vehicle 100 is demanded.

Figure 13:
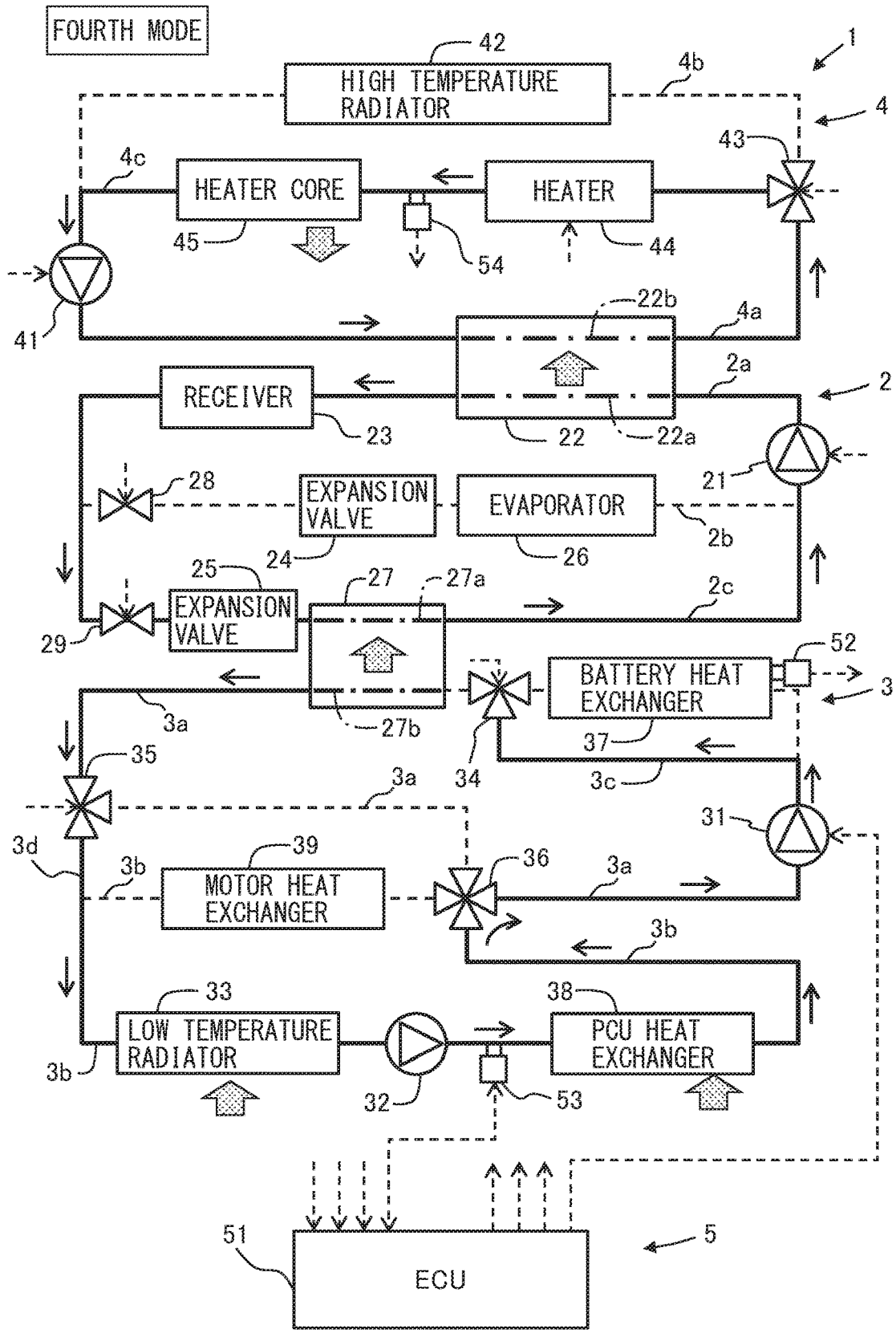
FIG. 13 shows one example of the operating state of the vehicle-mounted temperature controller in the case where the operating state of the low temperature circuit is in a fourth mode.

FIG. 13 shows the operating state of the vehicle-mounted temperature controller 1 in the case where the operating state of the low temperature circuit 3 is in a fourth mode. As will be understood from FIG. 13, in the fourth mode, the first pump 31 and second pump 32 are both operated. In addition, the four-way valve 36 is set to the second state. Therefore, the first partial circuit 3a and the second partial circuit 3b are connected with each other. In addition, the first three-way valve 34 is set to the first bypass flow path 3c side, while the second three-way valve 35 is set to the low temperature radiator 33 side (second bypass flow path 3d side). Note that, in the fourth mode, just one pump of either the first pump 31 or second pump 32 may also be operated.

As a result, if the operating state of the low temperature circuit 3 is in the fourth mode, the cooling water in the low temperature circuit 3 circulates through the first pump 31, cooling water piping 27b of the chiller 27, low temperature radiator 33, second pump 32, and PCU heat exchanger 38 in that order. In other words, the cooling water in the low temperature circuit 3 circulates without passing through the battery heat exchanger 37 and motor heat exchanger 39. Therefore, the cooling water in the low temperature circuit 3 absorbs heat from the outside air at the low temperature radiator 33 and absorbs heat from the PCU at the PCU heat exchanger 38 and discharges heat to the refrigerant of the refrigeration circuit 2 at the chiller 27.

Further, in the example shown in FIG. 13, in the same way as the example shown in FIG. 8, the compressor 21 and third pump 41 are operated. In addition, the first regulating valve 28 of the refrigeration circuit 2 is closed and the second regulating valve 29 is opened. Furthermore, the three-way valve 43 of the high temperature circuit 4 is set to the heater flow path 4c side. Therefore, the refrigerant in the refrigeration circuit 2 absorbs heat from the cooling water in the low temperature circuit 3 at the chiller 27, and discharges heat to the cooling water of the high temperature circuit 4 at the condenser 22. Further, the cooling water in the high temperature circuit 4 absorbs heat from the refrigerant in the refrigeration circuit 2 at the condenser 22, and discharges heat to the surrounding air at the heater core 45. Due to this discharge of heat, the inside of the compartment of the vehicle 100 is heated. The vehicle-mounted temperature controller 1 is, for example, set to the operating state shown in FIG. 13, when the temperature of the battery is low and heating of the inside of the compartment of the vehicle 100 is demanded and the temperature of the cooling water in the low temperature circuit 3 is not that low (for example, if higher than −20° C.).

Control of Vehicle-Mounted Temperature Controller

Figure 14:
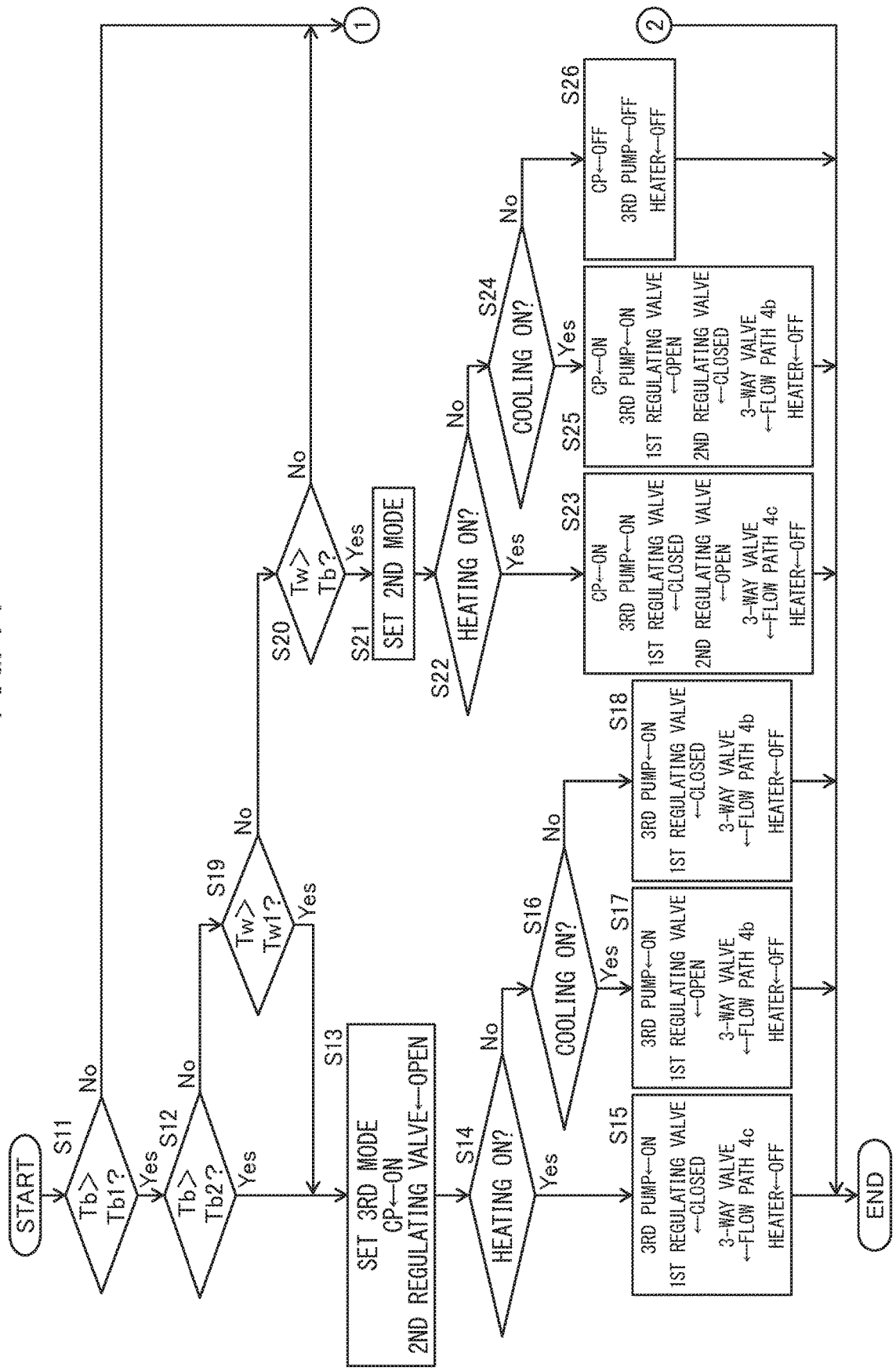
FIG. 14 is part of a flow chart showing one example of a control routine controlling the vehicle-mounted temperature controller.
Figure 15:
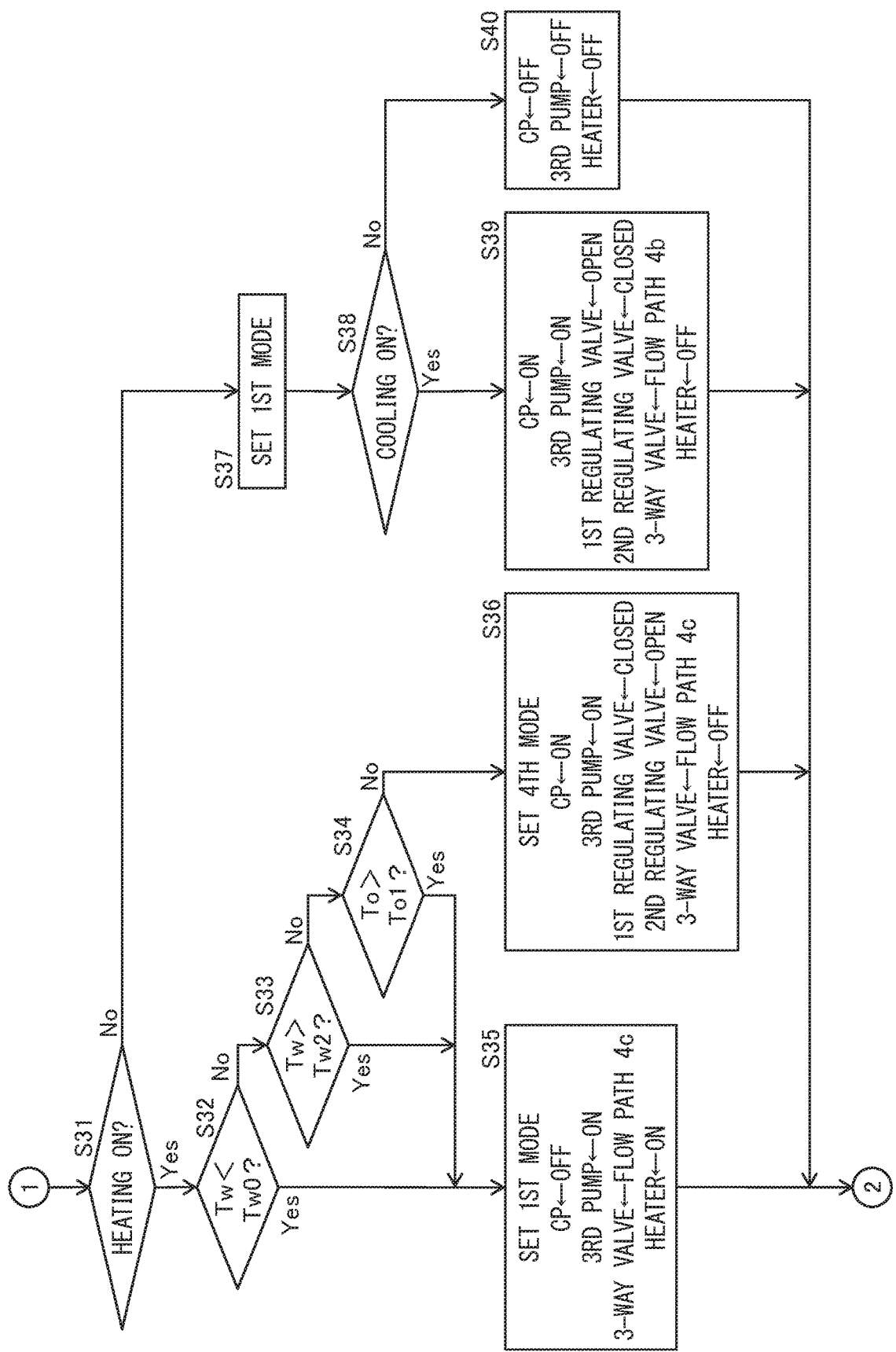
FIG. 15 is part of a flow chart showing one example of a control routine controlling the vehicle-mounted temperature controller.

FIGS. 14 and 15 are flow charts showing one example of a control routine for controlling the vehicle-mounted temperature controller 1. The illustrated control routine is performed every certain time interval.

As shown in FIG. 14, first, at step S11, it is determined if the temperature Tb of the battery is higher than the reference battery temperature Tb1. The temperature Tb of the battery is detected by the battery temperature sensor 52. The reference battery temperature Tb1 is a temperature at which battery deterioration, etc., does not proceed, but which will easily reaches a temperature at which battery deterioration, etc., will proceed if the temperature becomes more than that temperature, for example, is 30° C. If at step S11 it is determined that the temperature Tb of the battery is higher than the reference battery temperature Tb1, the control routine proceeds to step S12.

At step S12, it is determined if the temperature Tb of the battery is higher than the upper limit battery temperature Tb2. The upper limit battery temperature Tb2 is a temperature of the battery beyond which the battery deteriorates. For example, it is 40° C. If at step S12 it is determined that the temperature Tb of the battery is higher than the upper limit battery temperature Tb2, the control routine proceeds to step S13.

At step S13, the operating state of the low temperature circuit 3 is set to the third mode such as shown in FIGS. 10 to 12. Therefore, both the first pump 31 and second pump 32 are operated and the four-way valve 36 is set to the first state. Therefore, when the temperature Tb of the battery is higher than the upper limit battery temperature Tb2, the connection state of the low temperature circuit 3 is set to the first state. In addition, at step S13, the compressor 21 is operated and the second regulating valve 29 is opened.

Next, at step S14, it is determined if the heating demand has been set to ON. The ON/OFF state of the heating demand of the vehicle 100, for example, may be automatically switched based on the temperature setting of the user, the temperature in the vehicle compartment, etc., or may be directly switched by a switch by the user. If at step S14 it is determined that the heating demand is set to ON, the control routine proceeds to step S15.

At step S15, the third pump 41 is operated and the first regulating valve 28 is closed. In addition, the three-way valve 43 is set to the heater flow path 4c side, and the electric heater 44 is set to OFF. As a result, the vehicle-mounted temperature controller 1 becomes the operating state such as shown in FIG. 11.

On the other hand, if at step S14 it is determined that the heating demand is not set to ON, the control routine proceeds to step S16. At step S16, it is determined if the cooling demand is set to ON. The ON/OFF state of the cooling demand of the vehicle 100, for example, may be automatically switched based on the temperature setting of the user, the temperature in the vehicle compartment, etc., or may be directly switched by a switch by the user. If at step S16 it is determined that the cooling demand is set to ON, the control routine proceeds to step S17.

At step S17, the third pump 41 is operated and the first regulating valve 28 is opened. In addition, the three-way valve 43 is set to the radiator flow path 4b side, and the electric heater 44 is set to OFF. As a result, the vehicle-mounted temperature controller 1 becomes an operating state such as shown in FIG. 12.

If at step S16 it is determined that the cooling demand is not set to ON, that is, if there is neither of a heating and cooling demand, the control routine proceeds to step S18. At step S18, the third pump 41 is operated and the first regulating valve 28 is closed. In addition, the three-way valve 43 is set to the radiator flow path 4b side, and the electric heater 44 is set to OFF. As a result, the vehicle-mounted temperature controller 1 becomes the operating state such as shown in FIG. 10.

If at step S12 it is determined that the temperature Tb of the battery is equal to or less than the upper limit battery temperature Tb2, the control routine proceeds to step S19. At step S19, it is determined if the temperature of the cooling water Tw in the low temperature circuit 3, in particular the temperature of the cooling water Tw flowing into the PCU heat exchanger 38, is higher than the reference temperature Tw1. The temperature of the cooling water Tw in the low temperature circuit 3 is detected by the first water temperature sensor 53. Further, the reference temperature Tw1 is the temperature similar to the upper limit battery temperature Tb2, and is for example 40° C.

If at step S19 it is determined that the temperature of the cooling water Tw in the low temperature circuit 3 is higher than the reference temperature Tw1, the control routine proceeds to step S13. On the other hand, if at step S19 it is determined that the temperature of the cooling water Tw in the low temperature circuit 3 is equal to or less than the reference temperature Tw1, the control routine proceeds to step S20.

At step S20, it is determined if the temperature of the cooling water Tw in the low temperature circuit 3 is higher than the temperature Tb of the battery. If it is determined that the temperature of the cooling water Tw is higher than the temperature Tb of the battery, the control routine proceeds to step S21. On the other hand, if it is determined that the temperature of the cooling water Tw is equal to or lower than the temperature Tb of the battery, the control routine proceeds to step S31.

At step S21, the operating state of the low temperature circuit 3 is set to the second mode such as shown in FIGS. 7 to 9. Therefore, the first pump 31 and second pump 32 are both operated, and the four-way valve 36 is set to the second state.

That is, in the present embodiment, basically, when the temperature Tb of the battery is equal to or less than the upper limit battery temperature Tb2 and higher than the reference battery temperature Tb1, the operating state of the low temperature circuit 3 is set to the second mode. Therefore, at this time, the connection state of the low temperature circuit 3 is set to the second state where the battery heat exchanger 37 is connected to the chiller 27, PCU heat exchanger 38, and low temperature radiator 33.

Provided, however, that in the present embodiment, even when the temperature Tb of the battery is equal to or less than the upper limit battery temperature Tb2 and higher than the reference battery temperature Tb1, if the temperature of the cooling water Tw in the low temperature circuit 3 is higher than the reference temperature Tw1, the operating state of the low temperature circuit 3 is set to the third mode, while if the temperature of the cooling water Tw in the low temperature circuit 3 is higher than the temperature Tb of the battery, it is set to first mode or the fourth mode.

If at step S21 the operating state of the low temperature circuit 3 is set to the second mode, next, at step S22, it is determined if the heating demand is set to ON. If at step S22 it is determined that the heating demand is set to ON, the control routine proceeds to step S23. At step S23, the compressor 21 and third pump 41 are operated, the first regulating valve 28 is closed, and the second regulating valve 29 is opened. In addition, the three-way valve 43 is set to the heater flow path 4c side, and the electric heater 44 is set to OFF. As a result, the vehicle-mounted temperature controller 1 becomes the operating state such as shown in FIG. 8.

On the other hand, if at step S22 it is determined that the heating demand is not set to ON, the control routine proceeds to step S24. At step S24, it is determined if the cooling demand has been set to ON. If at step S24 it is determined that the cooling demand is set to ON, the control routine proceeds to step S25. At step S25, the compressor 21 and third pump 41 are operated, the first regulating valve 28 is opened, and the second regulating valve 29 is closed. In addition, the three-way valve 43 is set to the radiator flow path 4b side, and the electric heater 44 is set to OFF. As a result, the vehicle-mounted temperature controller 1 becomes an operating state such as shown in FIG. 9.

If at step S24 it is determined that the cooling demand is not set to ON, the control routine proceeds to step S26. At step S26, the compressor 21 and third pump 41 are stopped, and the electric heater 44 is set to OFF. As a result, the vehicle-mounted temperature controller 1 becomes an operating state such as shown in FIG. 7.

If at step S11 it is determined that the temperature Tb of the battery is equal to or less than the reference battery temperature Tb1, the routine proceeds to step S31. At step S31, it is determined if the heating demand is set to ON. If at step S31 it is determined that the heating demand is set to ON, the control routine proceeds to step S32.

At step S32, it is determined if the temperature of the cooling water Tw in the low temperature circuit 3 detected by the first water temperature sensor 53 is lower than the lower limit temperature Tw0. The lower limit temperature Tw0 is a temperature of the cooling water under which the refrigeration cycle can no longer be suitably realized in the refrigeration circuit 2, and is for example −20° C.

Further, at step S33, it is determined if the temperature of the cooling water Tw in the low temperature circuit 3 detected by the first water temperature sensor 53 is higher than the upper limit temperature Tw2. The upper limit temperature Tw2 is a temperature of the cooling water beyond which the PCU can no longer be sufficiently cooled. For example, it is 50° C.

In addition, at step S34, it is determined if the temperature To of the oil, which the motor heat exchanger 39 exchanges heat with, is higher than the upper limit temperature To1. The upper limit temperature To1 is the temperature of the oil beyond which the MG cannot be sufficiently cooled. For example, it is 80° C.

If at step S32 it is determined that the temperature of the cooling water Tw in the low temperature circuit 3 is lower than the lower limit temperature Tw0, if at step S33 it is determined that the temperature of the cooling water Tw in the low temperature circuit 3 is higher than the upper limit temperature Tw2, or if at S34 it is determined that the temperature To of the oil is higher than the upper limit temperature To1, the routine proceeds to step S35.

At step S35, the operating state of the low temperature circuit 3 is set to the first mode as shown in FIGS. 4 to 6. Therefore, the first pump 31 is stopped and the second pump 32 is operated. In addition, the four-way valve 36 is set to the first state. Further, at step S35, the compressor 21 is stopped, the third pump 41 is operated, the three-way valve 43 is set to the heater flow path 4c side, and the electric heater 44 is set to ON. As a result, vehicle-mounted temperature controller 1 becomes the operating state such as shown in FIG. 5.

On the other hand, if at step S32 it is determined that the temperature of the cooling water Tw in the low temperature circuit 3 is equal to or greater than the lower limit temperature Tw0, if at step S33 it is determined that the temperature of the cooling water Tw in the low temperature circuit 3 is equal to or less than the upper limit temperature Tw2, and if at step S34 the temperature To of the oil is equal to or less than the upper limit temperature To1, the routine proceeds to step S36.

At step S36, the operating state of the low temperature circuit 3 is set to the fourth mode such as shown in FIG. 13. Therefore, the first pump 31 and second pump 32 are operated together, and the four-way valve 36 is set to the second state. Further, at step S36, the compressor 21 and third pump 41 are operated, the first regulating valve 28 is closed, and the second regulating valve 29 is opened. In addition, the three-way valve 43 is set to the heater flow path 4c side, while the electric heater 44 is set to OFF. As a result, the vehicle-mounted temperature controller 1 becomes the operating state such as shown in FIG. 13.

That is, in the present embodiment, basically, when the heating demand is set to ON and the temperature of the cooling water Tw in the low temperature circuit 3 is lower than the lower limit temperature Tw0, the operating state of the low temperature circuit 3 is set to the first mode. Therefore, at this time, the connection state of the low temperature circuit 3 is set to the first state.

Further, in the present embodiment, basically, when the heating demand is set to ON and the temperature of the cooling water Tw in the low temperature circuit 3 is equal to or greater than the lower limit temperature Tw0, the operating state of the low temperature circuit 3 is set to the fourth mode. Therefore, at this time, the connection state of the low temperature circuit 3 is set to the second state where the battery heat exchanger 37 is not connected to the chiller 27, PCU heat exchanger 38, and low temperature radiator 33.

Note that, in the present embodiment, if the heating demand is set to ON, even when the temperature of the cooling water Tw in the low temperature circuit 3 is equal to or greater than the lower limit temperature Tw0, when the temperature of the cooling water Tw in the low temperature circuit 3 is higher than the upper limit temperature Tw2 or when the temperature To of the oil is higher than the upper limit temperature To1, the operating state of the low temperature circuit 3 is set to the first mode.

If at step S31 it is determined that the heating demand is not set to ON, the control routine proceeds to step S37. At step S37, the operating state of the low temperature circuit 3 is set to the first mode such as shown in FIGS. 4 to 6. Therefore, when the temperature of the battery is equal to or less than the reference battery temperature and heating inside the compartment of the vehicle 100 is not demanded, the connection state of the low temperature circuit 3 is set to the first state.

Next, at step S38, it is determined if the cooling demand is set to ON. If at step S38 it is determined that the cooling demand is set to ON, the control routine proceeds to step S39. At step S39, the compressor 21 and third pump 41 are both operated, the first regulating valve 28 is opened, and the second regulating valve 29 is closed. In addition, the three-way valve 43 is set to the radiator flow path 4b side, and the electric heater 44 is set to OFF. As a result, the vehicle-mounted temperature controller 1 becomes an operating state such as shown in FIG. 6.

If at step S38 it is determined that the cooling demand is not set to ON, the control routine proceeds to step S40. At step S40, the compressor 21 and third pump 41 are stopped and the electric heater 44 is set to OFF. As a result, the vehicle-mounted temperature controller 1 becomes an operating state such as shown in FIG. 4.

Action and Effect

In the present embodiment, in the low temperature circuit 3, in all modes of the first mode to the fourth mode, the cooling water in the low temperature circuit 3 flows through the PCU heat exchanger 38. Due to this, even if the amount of heat generated by the PCU temporarily becomes greater due to rapid acceleration, etc., the elements of the PCU are kept from exceeding the heat resistance temperature.

Further, in the present embodiment, if the operating state of the low temperature circuit 3 is in the first mode to the third mode, the cooling water of the low temperature circuit 3 circulates through the PCU heat exchanger 38 and the low temperature radiator 33. Due to this, it is possible to absorb heat from the PCU and discharge that heat at the low temperature radiator 33.

Furthermore, in the present embodiment, if the operating state of the low temperature circuit 3 is in the first mode to the third mode, the cooling water of the low temperature circuit 3 circulates through the motor heat exchanger 39 and the low temperature radiator 33. Due to this, it is possible to absorb heat from the MG and discharge that heat at the low temperature radiator 33.

In addition, in the present embodiment, if the operating state of the low temperature circuit 3 is in the second mode and third mode, the cooling water of the low temperature circuit 3 can circulate through the battery heat exchanger 37 and the low temperature radiator 33. Due to this, it is possible to absorb heat from the battery and discharge that heat at the low temperature radiator 33.

Further, in the present embodiment, if the operating state of the low temperature circuit 3 is the second mode and the cooling water of the low temperature circuit 3 absorbs heat at the low temperature radiator 33 and discharges heat at the battery heat exchanger 37, the cooling water flows and circulates through the low temperature radiator 33, battery heat exchanger 37, and motor heat exchanger 39 in that order. Due to this, the cooling water cooled at the low temperature radiator 33 flows into the battery heat exchanger 37 before the cooling water is raised in temperature by the motor heat exchanger 39 with its large amount of heat discharge, therefore it is possible to efficiently cool the battery.

Furthermore, in the present embodiment, if the operating state of the low temperature circuit 3 is in the third mode, the cooling water of the low temperature circuit 3 cooled by the chiller 27 flows through the battery heat exchanger 37. Due to this, when the battery becomes a high temperature, the battery can be rapidly cooled.

In addition, in the present embodiment, if the operating state of the low temperature circuit 3 is the fourth mode, the cooling water of the low temperature circuit 3 can circulate through the low temperature radiator 33 and the cooling water piping 27b of the chiller 27. Due to this, while heating the inside of the compartment of the vehicle 100, heat absorbed from the outside air at the low temperature radiator 33 can be used for heating.

Further, in the present embodiment, if the operating state of the low temperature circuit 3 is in the fourth mode, the cooling water cooled by passing through the cooling water piping 27b of the chiller 27 does not flow through the motor heat exchanger 39. Due to this, the oil in the motor heat exchanger 39 is kept from being excessively cooled and friction is kept from becoming larger.

Above, preferred embodiments according to the present invention were explained, but the present invention is not limited to these embodiments and can be modified and changed in various ways within the scope of the claims.

For example, in the above embodiment, if at step S33 of FIG. 15 it is determined that the temperature of the cooling water Tw in the low temperature circuit 3 is higher than the upper limit temperature Tw2 or if at step S34 it is determined that the temperature To of the oil is higher than the upper limit temperature To1, the operating state of the low temperature circuit 3 is set to the first mode and the electric heater 44 is set to ON. Therefore, the vehicle-mounted temperature controller 1 becomes the operating state such as shown in FIG. 5.

However, in this case, the vehicle-mounted temperature controller 1 may also be made the operating state shown in FIG. 8. Provided, however, that in this case, the battery does not have to be cooled, therefore the first three-way valve 34 is set to the first bypass flow path 3c side. As a result, if the temperature of the cooling water in the low temperature circuit 3 is extremely high or if the temperature of the oil of the motor heat exchanger 39 is extremely high, the chiller 27 can be utilized to rapidly cool the cooling water or the oil.

REFERENCE SIGNS LIST

1 vehicle-mounted temperature controller
2 refrigeration circuit
3 low temperature circuit
4 high temperature circuit
5 control device
6 air passage
22 condenser
27 chiller
33 low temperature radiator
34 first three-way valve
35 second three-way valve
36 four-way valve
37 battery heat exchanger
38 PCU heat exchanger
39 motor heat exchanger

The invention claimed is:

1. A vehicle-mounted temperature controller used in a vehicle, the vehicle having a motor for driving a vehicle, a battery supplying electric power to the motor, and a power control unit (PCU) controlling electric power supplied to the motor, comprising:
   a first heat circuit having a battery heat exchanger exchanging heat with the battery, a PCU heat exchanger exchanging heat with the power control unit, a radiator, and a first heat exchanger, and configured so that the first heat medium circulates through them; and
   a refrigeration circuit having a second heat exchanger discharging heat from a refrigerant to something other than the refrigerant and the first heat medium to make the refrigerant condense, and the first heat exchanger absorbing heat from the first heat medium to the refrigerant to make the refrigerant evaporate, and configured to realize a refrigeration cycle by the refrigerant being circulated through them, wherein the first heat circuit is configured to be able to switch connection states between a first state where the battery heat exchanger and the first heat exchanger are connected so that the first heat medium flows through them, the PCU heat exchanger and the radiator are connected so that the first heat medium flows through them and the battery heat exchanger and the first heat exchanger are not connected to the PCU heat exchanger and the radiator in a state where the first heat medium flows through them, and a second state where the first heat exchanger, the PCU heat exchanger, and the radiator are connected so that the first heat medium flows through them, wherein when a temperature of the battery is higher than the reference battery temperature, a connection state of the first heat circuit is set to the second state and a state where the battery heat exchanger is not connected to the first heat exchanger, the PCU heat exchanger, and the radiator so that the first heat medium flows through them.

2. The vehicle-mounted temperature controller according to claim 1, further comprising a motor heat exchanger exchanging heat with the motor, wherein in the first state, the motor heat exchanger is connected to the PCU heat exchanger and the radiator so that the first heat medium flows through them, and the battery heat exchanger and the first heat exchanger are not connected to the PCU heat exchanger, the radiator, and the motor heat exchanger in a state where the first heat medium flows through them.

3. The vehicle-mounted temperature controller according to claim 2, wherein the first heat circuit is configured to be able to switch connection states between a state where, in the second state, the motor heat exchanger is connected to the first heat exchanger, the PCU heat exchanger, and the radiator so that the first heat medium flows through it and a state where the motor heat exchanger is not connected to the first heat exchanger, the PCU heat exchanger, and the radiator so that the first heat medium flows through it.

4. The vehicle-mounted temperature controller according to claim 3, wherein the first heat circuit is configured so that in the second state and in a state where the motor heat exchanger is connected to the first heat exchanger, the PCU heat exchanger, and the radiator so that the first heat medium flows through them, the first heat medium circulates through the radiator, the PCU heat exchanger, and the motor heat exchanger in that order.

5. The vehicle-mounted temperature controller according to claim 2, wherein the first heat circuit is configured so that, in the first state, the first heat medium circulates through the radiator, the PCU heat exchanger, and the motor heat exchanger in that order.

6. The vehicle-mounted temperature controller according to claim 1, wherein the first heat circuit is configured so as to be able to switch connection states, in the second state, between a state where the battery heat exchanger is connected to the first heat exchanger, the PCU heat exchanger, and the radiator so that the first heat medium flows through them, and a state where the battery heat exchanger is not connected to the first heat exchanger, the PCU heat exchanger, and the radiator so that the first heat medium flows through them.

7. The vehicle-mounted temperature controller according to claim 1, wherein when a temperature of the battery is higher than an upper limit battery temperature, which is higher than the reference battery temperature, the connection state of the first heat circuit is set to the first state.

8. The vehicle-mounted temperature controller according to claim 1, wherein when a temperature of the battery is equal to or less than the reference battery temperature and heating inside the compartment of the vehicle is not demanded, the connection state of the first heat circuit is set to the first state.

9. The vehicle-mounted temperature controller according to claim 1, wherein when a temperature of the battery is equal to or less than the reference battery temperature and heating inside the compartment of the vehicle is demanded and the temperature of the first heat medium is lower than a predetermined lower limit heat medium temperature, the connection state of the first heat circuit is set to the first state.

10. The vehicle-mounted temperature controller according to claim 9, wherein when a temperature of the battery is equal to or less than the reference battery temperature and heating inside the compartment of the vehicle is demanded and the temperature of the first heat medium is equal to or greater than the lower limit heat medium temperature, the connection state of the first heat circuit is set to the second state where the battery heat exchanger is not connected to the first heat exchanger, the PCU heat exchanger, and the radiator.

11. The vehicle-mounted temperature controller according to claim 1, further comprising a second heat circuit having a heater core performing heating of the inside of a vehicle compartment and configured so that the second heat medium circulates through the heater core, wherein the second heat exchanger exchanges heat between the refrigerant and the second heat medium so as to make heat move from the refrigerant to the second heat medium.

* * * * *